(12) United States Patent
Yang et al.

(10) Patent No.: US 11,968,629 B2
(45) Date of Patent: Apr. 23, 2024

(54) TRANSMISSION POWER CONTROL

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/110,693

(22) Filed: Feb. 16, 2023

(65) Prior Publication Data
US 2023/0209480 A1 Jun. 29, 2023

Related U.S. Application Data

(63) Continuation of application No. PCT/KR2022/004632, filed on Mar. 31, 2022.

(30) Foreign Application Priority Data

| Apr. 2, 2021 | (KR) | .................. | 10-2021-0043179 |
| Oct. 22, 2021 | (KR) | .................. | 10-2021-0142015 |

(Continued)

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/242* (2013.01); *H04W 52/262* (2013.01); *H04W 52/383* (2013.01)

(58) Field of Classification Search
CPC ............. H04W 52/367; H04W 52/146; H04W 52/242; H04W 52/262; H04W 52/383
See application file for complete search history.

(56) References Cited

U.S. PATENT DOCUMENTS

| 2018/0020412 A1* | 1/2018 | Lee ...................... H04W 52/30 |
| 2018/0034683 A1 | 2/2018 | Li et al. |

(Continued)

OTHER PUBLICATIONS

CATT, CR for TS 38.101-3, General corrections for NR V2X, R4-2103141, 3GPP TSG-RAN WG4 Meeting #98-e, Electronic Meeting, Feb. 9, 2021, sections 6.2E.1.2, 6.2E.2.2, 6.2E.4.2, 7.3E.2.3.

(Continued)

Primary Examiner — John J Lee
(74) Attorney, Agent, or Firm — BRYAN CAVE LEIGHTON PAISNER LLP

(57) ABSTRACT

There is provided a UE for configured to operate in a wireless system. The UE comprises: at least one transceiver; at least one processor; and at least one computer memory operably connectable to the at least one processor and storing instructions that, based on being executed by the at least one processor, perform operations comprising: determining SL transmit power for SL signal based on MPR value; determining UL transmit power for UL signal based on the MPR value; transmitting the SL signal based on the SL transmit power; and transmitting the UL signal based on the UL transmit power.

17 Claims, 22 Drawing Sheets

(30) Foreign Application Priority Data

Oct. 29, 2021 (KR) .......................... 10-2021-0147042
Jan. 7, 2022 (KR) .......................... 10-2022-0003007

(51) Int. Cl.
*H04W 52/24* (2009.01)
*H04W 52/26* (2009.01)
*H04W 52/38* (2009.01)

(56) References Cited

U.S. PATENT DOCUMENTS

2019/0261286 A1* 8/2019 Suzuki .................. H04W 52/34
2020/0336353 A1* 10/2020 Frank .................. H04W 52/146
2022/0303165 A1* 9/2022 Chae .................... H04J 11/0076

OTHER PUBLICATIONS

LG Electronics et al., Correction on 5G V2X UE RF requirements in rel-16, R4-2011705, 3GPP TSG-RAN4 Meeting #96-e, Online, Aug. 30, 2020, sections 6-6.2E.4.1.
3GPP TS 38.133 V17.1.0, Mar. 2021.
3GPP TS 38.213 V16.6.0, Jun. 2021.
3GPP TS 38.331 V17.0.0, Mar. 2022.

* cited by examiner

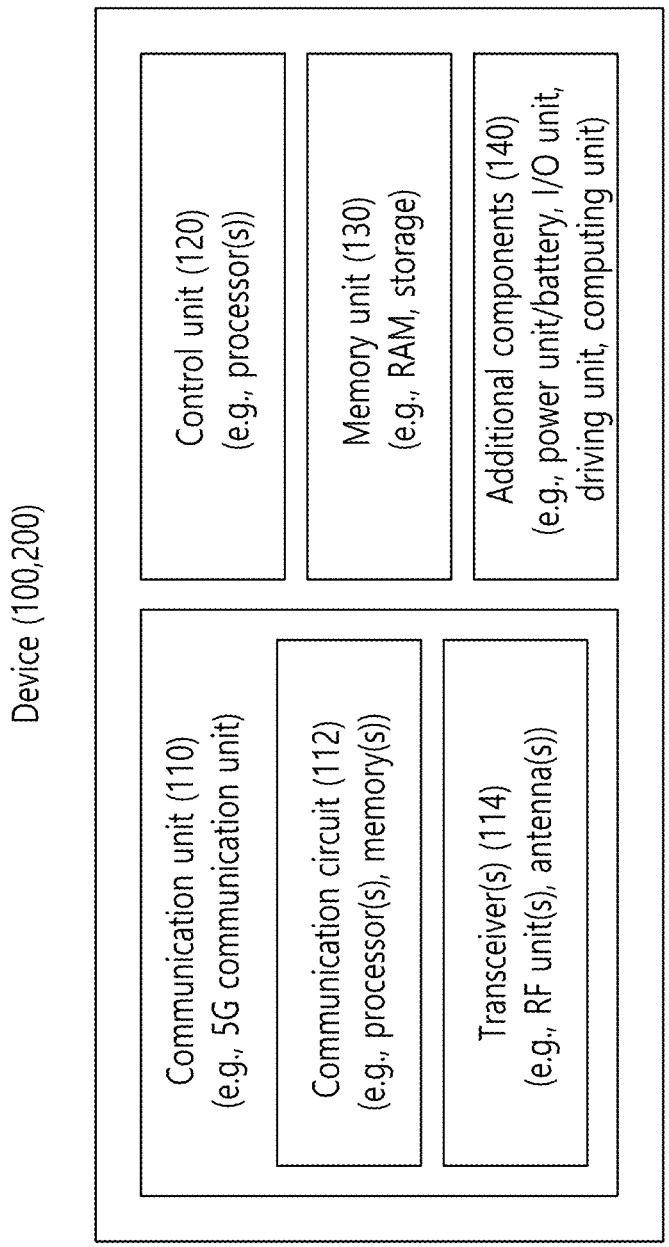

FIG. 5
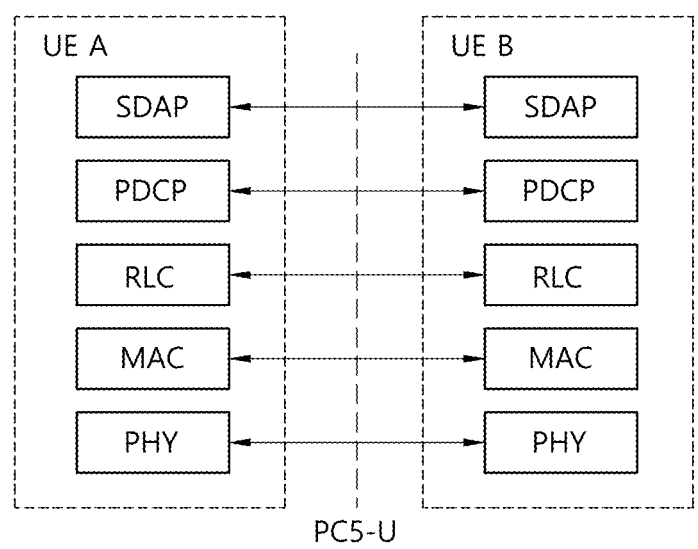
(a)
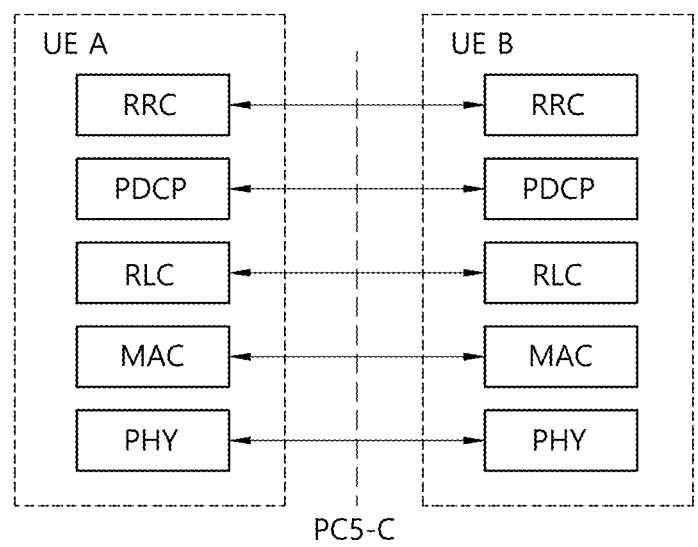
(b)

FIG. 7

| Items | Assumption |
|---|---|
| Sub-channel sizes for NR SL | {10}, it is minimum PRBs for NR SL among {10, 12, 15, 20, 25, 50, 75, 100}<br>No restriction of size of BRS for NR Uu |
| Allowed $L_{CRB}$ allocation for NR SL | 10 for NR SL(minimum value)<br>1 for NR Uu(minimum value)<br>The values are selected for worst case in aspect for MPR |
| Regarding PSSCH/PSCCH multiplexing | For 3-symbol PSCCH<br><br>SL symbol index: 0 1 2 3 4 5 6 7 8 9 10 11 12 13<br>DMRS at symbol 4 and symbol 10 |
| PSCCH size | 10RB*3 Symbols |
| PSD offset of X dB between PSCCH and PSSCH | 0dB |

FIG. 8

| $\Delta f_{OOB}$ (MHz) | Spectrum emission limit (dBm) / channel bandwidth | | | | | | | | | | | | | | Measurement bandwidth |
|---|---|---|---|---|---|---|---|---|---|---|---|---|---|---|---|
| | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz | | |
| ± 0-1 | -13 | -13 | -13 | -13 | -13 | -13 | -13 | | | | | | | 1 % channel bandwidth |
| ± 1-5 | -10 | -10 | -10 | -10 | -10 | -10 | -10 | -24 | -24 | -24 | -24 | -24 | -24 | 30 kHz |
| ± 5-6 | -13 | -13 | -13 | -13 | -13 | -13 | -13 | -10 | -10 | -10 | -10 | -10 | -10 | 1 MHz |
| ± 6-10 | -25 | | | | | | | -13 | -13 | -13 | -13 | -13 | -13 | |
| ± 10-15 | | -25 | | | | | | | | | | | | |
| ± 15-20 | | | -25 | | | | | | | | | | | |
| ± 20-25 | | | | -25 | | | | | | | | | | |
| ± 25-30 | | | | | -25 | | | | | | | | | |
| ± 30-35 | | | | | | -25 | | | | | | | | |
| ± 35-40 | | | | | | | | | | | | | | |
| ± 40-45 | | | | | | | -25 | | | | | | | |
| ± 45-50 | | | | | | | | | | | | | | |
| ± 50-55 | | | | | | | | -25 | | | | | | |
| ± 55-60 | | | | | | | | | | | | | | |
| ± 60-65 | | | | | | | | | -25 | | | | | |
| ± 65-70 | | | | | | | | | | | | | | |
| ± 70-75 | | | | | | | | | | -25 | | | | |
| ± 75-80 | | | | | | | | | | | | | | |
| ± 80-85 | | | | | | | | | | | -25 | | | |
| ± 85-90 | | | | | | | | | | | | | | |
| ± 90-95 | | | | | | | | | | | | -25 | | |
| ± 95-100 | | | | | | | | | | | | | | |
| ± 100-105 | | | | | | | | | | | | | -25 | |

TRANSMISSION POWER CONTROL

This application is the Continuation Bypass of International Application No. PCT/KR2022/004632 filed on Mar. 31, 2022, which claims the benefit of Korean Patent Application Nos. 10-2021-0043179 filed on Apr. 2, 2021; 10-2021-0142015 filed on Oct. 22, 2021; 10-2021-0147042 filed on Oct. 29, 2021 and 10-2022-0003007 filed on Jan. 7, 2022, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Conventionally, a terminal that simultaneously transmits NR Sidelink (SL) and NR Uu in a single licensed band has not been defined. Recently, a terminal capable of such an operation was introduced. Since SL communication and UL communication have different propagation paths, independent power control is applied, thus an independent modulation order can be applied.

So far, in a single licensed band, Maximum Power Reduction (MPR) to which different modulation orders are applied has not been defined. Thus, the terminal cannot use MPR efficiently and/or precisely to determine transmission power. Therefore, the MPR for a terminal that simultaneously transmits NR SL and NR Uu in a single licensed band needs to be defined based on a consideration of modulation orders for NR SL and NR Uu.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: determining SL transmit power for SL signal based on MPR value; determining UL transmit power for UL signal based on the MPR value; transmitting the SL signal based on the SL transmit power; and transmitting the UL signal based on the UL transmit power.

In accordance with an embodiment of the present disclosure, a disclosure of the present specification provides a method for performing communication. The method is performed by a UE and comprising: determining SL transmit power for SL signal based on MPR value; determining UL transmit power for UL signal based on the MPR value; transmitting the SL signal based on the SL transmit power; and transmitting the UL signal based on the UL transmit power.

In accordance with an embodiment of the present disclosure, a disclosure of the present specification provides wireless communication device operating in a wireless communication system, the wireless communication device comprising: determining SL transmit power for SL signal based on MPR value; determining UL transmit power for UL signal based on the MPR value; generating the SL signal based on the SL transmit power; and generating the UL signal based on the UL transmit power.

In accordance with an embodiment of the present disclosure, a disclosure of the present specification provides CRM storing instructions that, based on being executed by at least one processor, perform operations comprising: determining SL transmit power for SL signal based on MPR value; determining UL transmit power for UL signal based on the MPR value; generating the SL signal based on the SL transmit power; and generating the UL signal based on the UL transmit power.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 3 shows an example of a wireless device to which implementations of the present disclosure is applied.

FIG. 5 shows a radio protocol architecture for a SL communication, based on an embodiment of the present disclosure.

FIG. 7 illustrates an example of MPR simulation assumption for PSCCH/PSSCH according to an embodiment of the present disclosure.

FIG. 8 shows examples of General NR spectrum emission mask according to an embodiment of the present disclosure.

DETAILED DESCRIPTION

Figure 1:
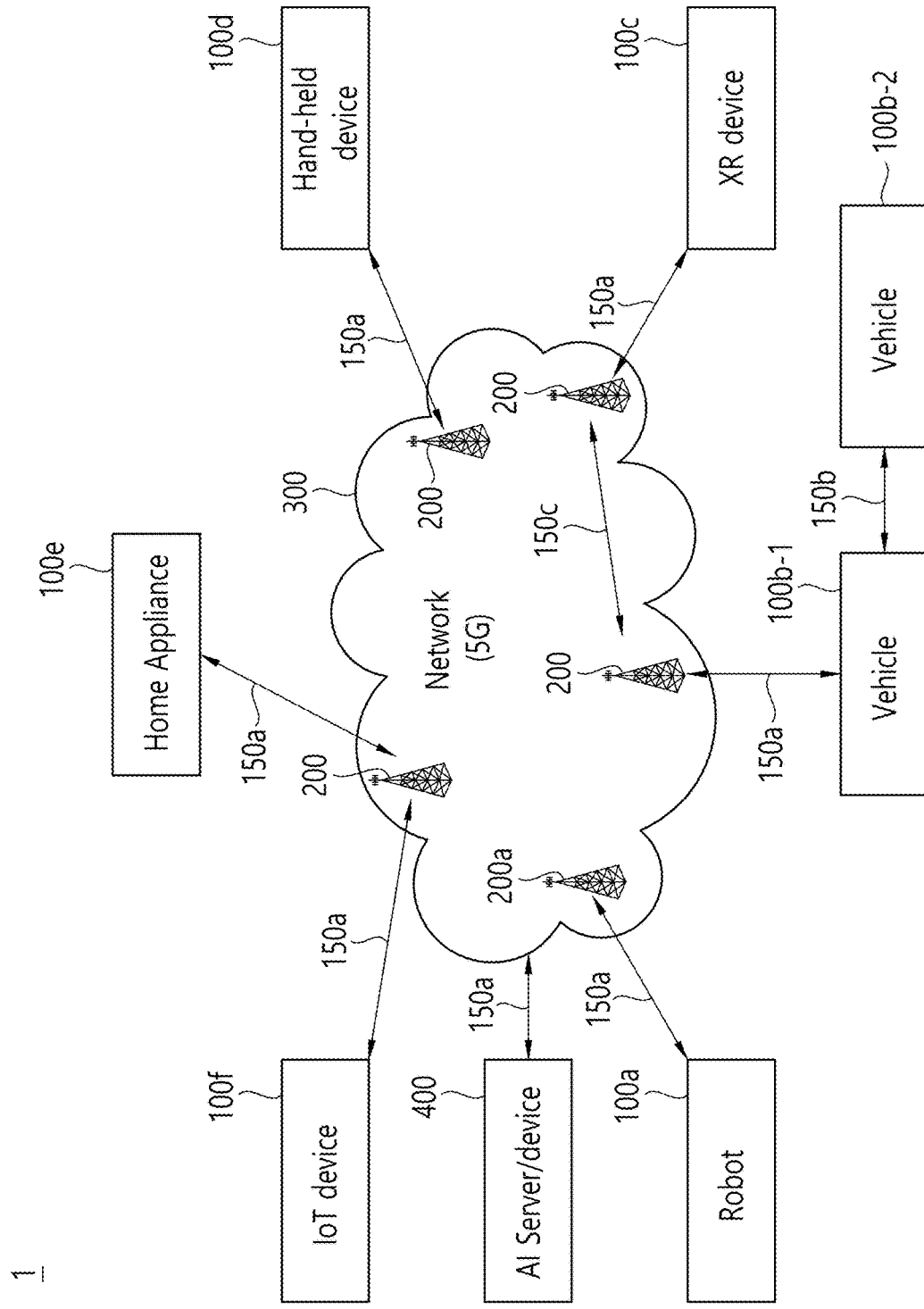
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be referred to as another term such as an evolved-NodeB (eNodeB), an evolved-NodeB (eNB), a BTS (Base Transceiver System), an access point (Access Point), gNB (Next generation NodeB), etc.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR 2-1 and FR 2-2 as shown in Examples of Table 1 and Table 2.

TABLE 1

| Frequency Range designation | | Corresponding frequency range | Subcarrier Spacing |
|---|---|---|---|
| FR1 | | 450 MHz-6000 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
|---|---|---|---|
| FR1 | | 410 MHz-7125 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
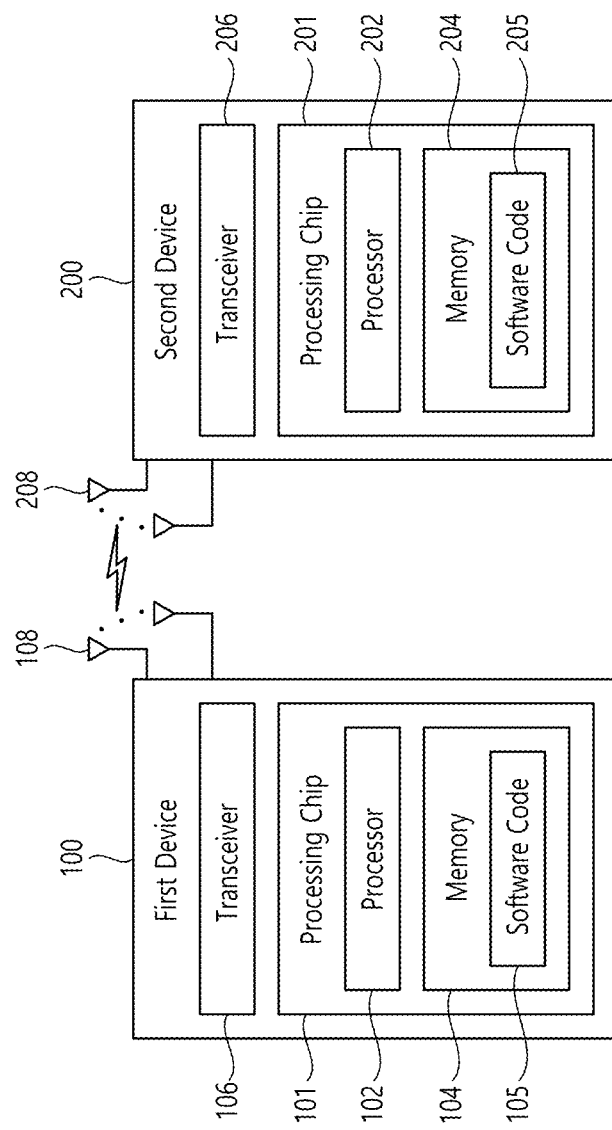
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This is called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 4A:
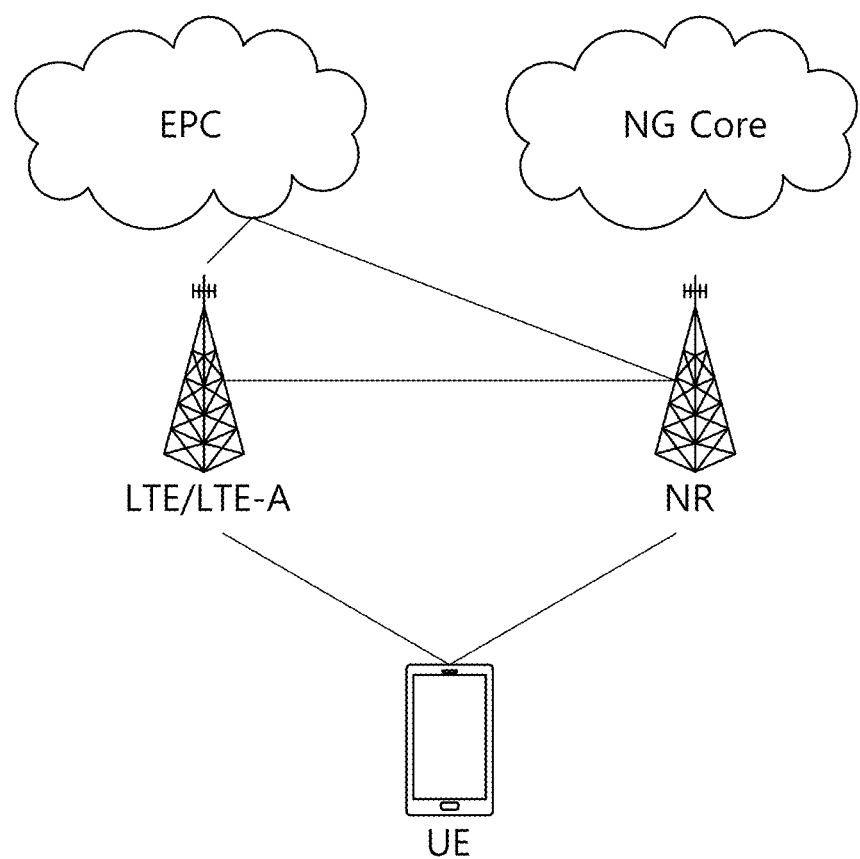
FIGS. 4a to 4c are diagrams illustrating exemplary architecture for a next-generation mobile communication service.
Figure 4B:
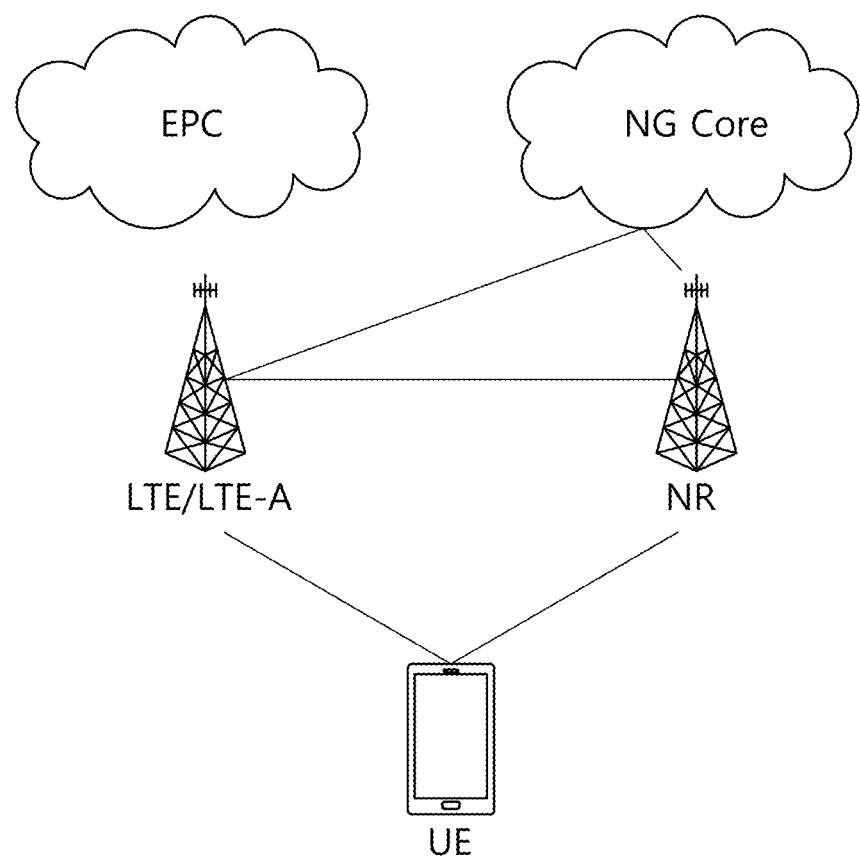
Figure 4C:
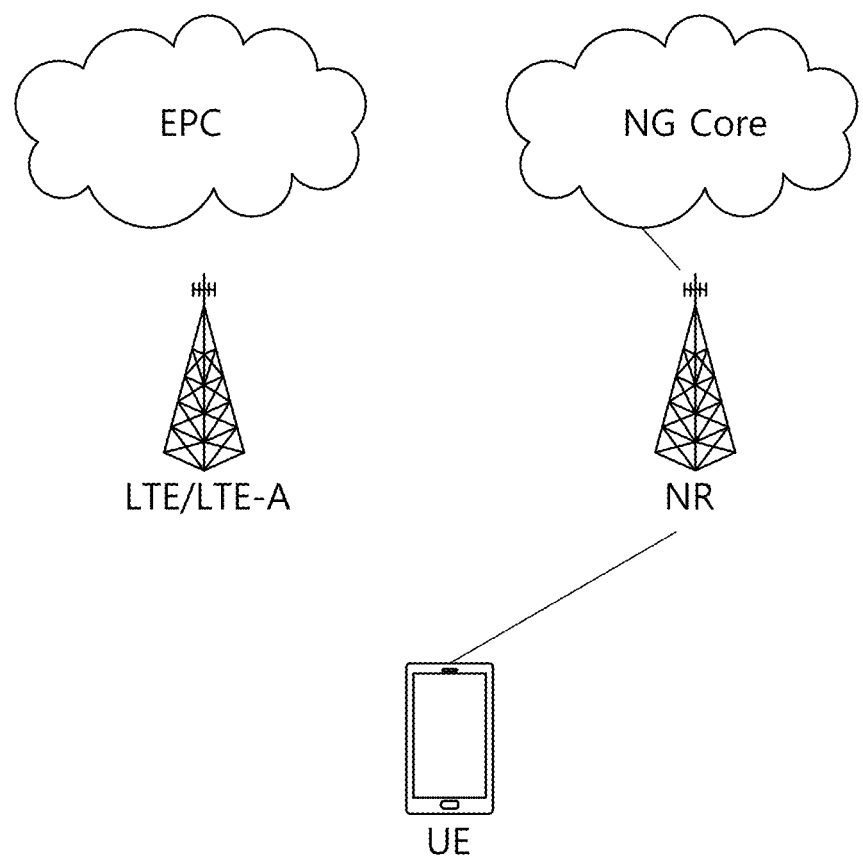

FIGS. 4a to 4c are diagrams illustrating exemplary architecture for a next-generation mobile communication service.

Referring to FIG. 4a, a UE is connected in dual connectivity (DC) with an LTE/LTE-A cell and a NR cell.

The NR cell is connected with a core network for the legacy fourth-generation mobile communication, that is, an Evolved Packet core (EPC). In example shown in FIG. 4a, the UE is configured with EN-DC (E-UTRA-NR DC). The UE, which is configured with EN-DC, is connected with an E-UTRA (that is, LTE/LTE-A) cell and an NR cell. Here, a PCell in EN-DC may be an E-UTRA (that is, LTE/LTE-A) cell, and a PSCell in EN-DC may be an NR cell.

Referring to FIG. 4b, the LTE/LTE-A cell is connected with a core network for 5th generation mobile communication, that is, a Next Generation (NG) core network, unlike the example in FIG. 4a.

A service based on the architecture shown in FIGS. 4a and 4b is referred to as a non-standalone (NSA) service.

Referring to FIG. 4c, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

<V2X or SL Communication>

Hereinafter, Vehicle to Everything (V2X) or Sidelink (SL) communication will be described.

FIG. 5 shows a radio protocol architecture for a SL communication, based on an embodiment of the present disclosure.

The embodiment of FIG. 5 may be combined with various embodiments of the present disclosure. More specifically, FIG. 5(a) shows a user plane protocol stack, and FIG. 5(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
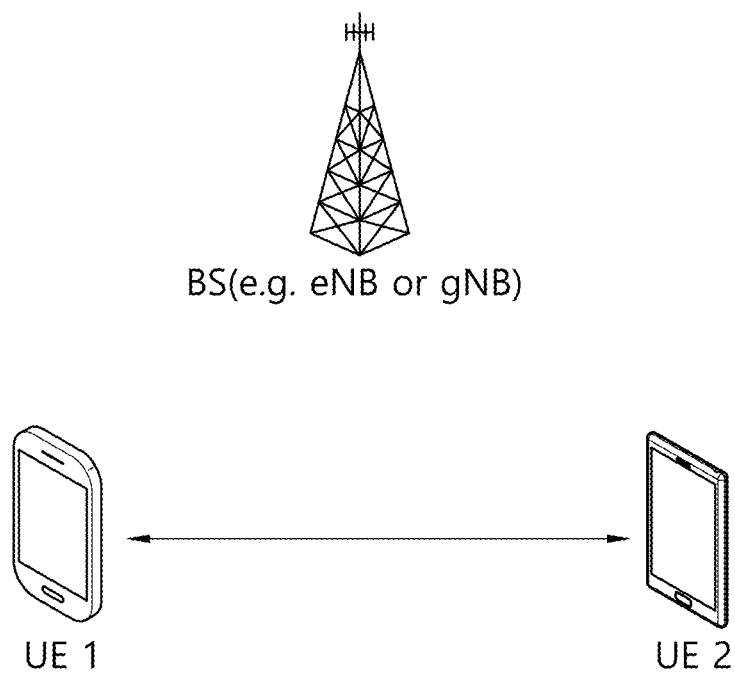
FIG. 6 shows a UE performing V2X or SL communication, based on an embodiment of the present disclosure.

FIG. 6 shows a UE performing V2X or SL communication, based on an embodiment of the present disclosure.

The embodiment of FIG. 6 may be combined with various embodiments of the present disclosure.

Referring to FIG. 6, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

<Operating Band in NR>

An operating band shown in Table 3 is a reframing operating band that is transitioned from an operating band of LTE/LTE-A. This operating band is referred to as FR1 band.

TABLE 3

| NR Band Operating | Uplink Operating Band $F_{UL\_low}$-$F_{UL\_high}$ | Downlink Operating Band $F_{dL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |

The following table shows an NR operating band defined at high frequencies. This operating band is referred to as FR2 band.

TABLE 4

| NR Band Operating | Uplink Operating Band $F_{UL\_low}$-$F_{UL\_high}$ | Downlink Operating Band $F_{dL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |
| n263 | 57000 MHz-71000 MHz | 57000 MHz-71000 MHz | TDD |

<Disclosure of the Present Specification>

Conventionally, a terminal that simultaneously transmits NR Sidelink (SL) and NR Uu in a single licensed band has not been defined. Recently, a terminal capable of such an operation was introduced. Since SL communication and UL communication have different propagation paths, independent power control is applied, thus an independent modulation order can be applied.

So far, in a single licensed band, Maximum Power Reduction (MPR) to which different modulation orders are applied has not been defined. Thus, the terminal cannot use MPR efficiently and/or precisely to determine transmission power. Therefore, the MPR for a terminal that simultaneously transmits NR SL and NR Uu in a single licensed band needs to be defined based on a consideration of modulation orders for NR SL and NR Uu.

The present disclosure specifies examples of performance requirements for a new maximum output power reduction (MPR) for PSCCH/PSSCH applied to a terminal (e.g. User Equipment (UE)) supporting simultaneous transmission of NR SL PC5 and NR Uu link. This terminal may be power class 3 UE or power class 2 UE. For example, NR SL PC5 may be NR V2X SL.

Power class of UE may mean the maximum allowed output power of the all types of device. The power class shall be distinguished by the maximum allowed power levels in all device type. Then, the power class 2 UE can support maximum output power up to 26 dBm. The power class 3 UE can support maximum output power up to 23 dBm.

For a terminal supporting simultaneous NR V2X sidelink and NR Uu link transmission, NR V2X supports all of 15 kHz, 30 kHz, 60 kHz subcarrier spacing and Quadrature Phase Shift Keying (QPSK), 16 Quadrature Amplitude Modulation (QAM) (16QAM), 64QAM, 256QAM modulation order. Thus, it is necessary to analyze each MPR performance for subcarriers spacing and modulation order, assuming simultaneous transmission of SL signal and NR uplink signal.

Various examples of the present disclosure proposes MPR performance requirements for each terminal by dividing it into a case of a power class 3 terminal with a maximum total output power of 23 dBm and a case of a power class 2 terminal with a maximum total output power of 26 dBm.

Assumptions for the MPR simulation of NR V2X UE are as shown in Table 5 and FIG. 7.

TABLE 5

| parameter | Assumption |
| --- | --- |
| center frequency | 4.5 GHz (n79) |
| Each Bandwidth | 10/20 MHz for NR SL |
|  | 10/20/40/60/80 MHz for NR Uu |
| Maximum total output power | 23 dBm/26 dBm |
| numerology | 15 KHz, 30 kHz and 60 kHz |
| Modulation | QPSK/16 QAM/64 QAM/256 QAM |
| Waveform | CP-OFDM for NR SL |
|  | CP-OFDM for NR Uu |
| Carrier leakage | 25 dBc |
| IQ image | 25 dBc |
| CIM3 | 45~60 dBc |
| PA calibration | PA calibrated per Component Carrier (CC) to deliver −30 dBc ACLR for a fully allocated RBs in 20 MHz QPSK DFT-S-OFDM waveform at 1 dB MPR. |

CP-OFDM may mean Cyclic Prefix Orthogonal Frequency Division Multiplexing. IQ (In-phase quadrature) image may mean image signal which was made by RF Mixer. For example, when original signal passes RF mixer (e.g. local oscillator), IQ image signal is generated. CIM3 may mean counter-IM3 ($3^{rd}$ inter-modulation) which is producted in the output signal of the transmitter. PA calibration may mean PA adjustment to meet ACLR with 1 dB MPR. ACLR may mean Adjacent Channel Leakage Ratio. QPSK DFT-S-OFDM may mean QPSK discrete Fourier transform spread OFDM.

Table 5 shows an example of General MPR simulation assumption for NR V2X con-current operation with NR UL. In the present disclosure, NR V2X con-current operation with NR UL may mean that NR V2X communication and NR UL communication can be performed simultaneously by the terminal.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 illustrates an example of MPR simulation assumption for PSCCH/PSSCH according to an embodiment of the present disclosure.

FIG. 7 shows an example of MPR simulation assumption for PSCCH/PSSCH. $L_{CRB}$ may mean the length of a contiguous resource block allocation. PSD may mean power spectrum density RB may mean Resource Block. PRB may mean Physical Resource Block. Regarding PSCCH/PSSCH multiplexing may mean one example for resource allocation of PSCCH and PSSCH. PSCCH may consist of 3 symbols in SL symbol index #1, #2 and #3 and PSSCH may consist of 10 symbols in SL symbol index #1~#3, #5~#9, #11 and #12. DeModulation Reference Signal (DMRS) is located in SL symbol index #4 and #10. In SL symbol index #1~#3, PSCCH and PSCCH are multiplexed in frequency domain.

Assumptions for the MPR simulation of NR V2X UE shown in Table 5 and FIG. 7 are used for determining MPR in the present disclosure.

Examples of MPR based on spectrum emission mask (SEM) and spurious emission (SE) are explained as the following based on various examples of the present disclosure.

For UE capable of NR V2X con-current operation with Uu (NR Uu), following general SEM are applied for all supporting NR V2X channel bandwidths.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 8 shows examples of General NR spectrum emission mask according to an embodiment of the present disclosure.

FIG. 8 shows examples of General NR spectrum emission mask

FIG. 8 shows examples of spectrum emission limit based on $\Delta f_{OOB}$ and channel bandwidth.

$\Delta f_{OOB}$ may mean frequencies starting from the +/−edge of the assigned NR channel bandwidth. 1% channel bandwidth may mean channel bandwidth*0.01. For example, when channel bandwidth is configured as 10 MHz, measurement is performed based on 100 kHz.

Table 6 shows an example of spurious emission limits, which are applied to all transmitter band configuration and channel bandwidth.

TABLE 6

| Frequency Range | Maximum Level | Measurement bandwidth | NOTE |
|---|---|---|---|
| 9 kHz ≤ f < 150 kHz | −36 dBm | 1 kHz | |
| 150 kHz ≤ f < 30 MHz | −36 dBm | 10 kHz | |
| 30 MHz ≤ f < 1000 MHz | −36 dBm | 100 kHz | |
| 1 GHz ≤ f < 12.75 GHz | −30 dBm | 1 MHz | 4 |
| | −25 dBm | 1 MHz | 3 |
| 12.75 GHz ≤ f < 5th harmonic of the upper frequency edge of the UL operating band in GHz | −30 dBm | 1 MHz | 1 |
| 12.75 GHz < f < 26 GHz | −30 dBm | 1 MHz | 2 |

NOTE 1:
Applies for Band that the upper frequency edge of the UL Band more than 2.69 GHz
NOTE 2:
Applies for Band that the upper frequency edge of the UL Band more than 5.2 GHz
NOTE 3:
Applies for Band n41, CA configurations including Band n41, and EN-DC configurations that include n41 when Network Signalling (NS)_04 is signalled.
NOTE 4:
Dose not apply for Band n41, CA configurations including Band n41, and EN-DC configurations that include n41 when NS_04 is signalled.

Table 6 shows an example of Requirement for general spurious emission limits. According to Table 6, maximum level of spurious emission and measurement bandwidth are dependent on frequency ranges. In addition, EVM (Error Vector Magnitude) is considered. EVM of 17.5%, 12.5%, 8% and 3.5% is for QPSK, 16QAM, 64QAM and 256QAM. That is, for QPSK, 16QAM, 64QAM and 256QAM, EVM of 17.5%, 12.5%, 8% and 3.5% are additionally considered.

Table 7 shows simulation assumptions considered in the present disclosure.

TABLE 7

Channel BW configurations for class B
10 MHz (NR SL, 30 kHz SCS) + 10/20/40/60/80 MHz
(NR Uu, 30 kHz SCS)
20 MHz (NR SL, 30 kHz SCS) + 20/40/80 MHz (NR Uu, 30 kHz SCS)
WaveformCP-OFDM(NR SL) + CP-OFDM(NR Uu)
Maximum total output power26 dBm:23 dBm 2 Power Amplifiers (PA)s
23 dBm:Back off 3 dB with 23 dBm 2 PAs
Modulation orderQPSK/16 QAM/64 QAM/256 QAM
Sub-channel sizes for NR SL10/24 RB for 10 MHz
10/50 RB for 20 MHz
Resource Block (RB) sizes for NR Uu1 RB for 10/20/40/60/80 MHz Table 7 shows considered simulation assumptions for simulation of the present disclosure.

Based on Table 5, FIG. 7, FIG. 8, Table 6, and Table 7, simulations for MPR of based on different condition were performed. For example, imulations of the present disclosure were performed for the UE supporting simultaneous transmission of both NR SL signal and NR Uu signal.

Figure 9:
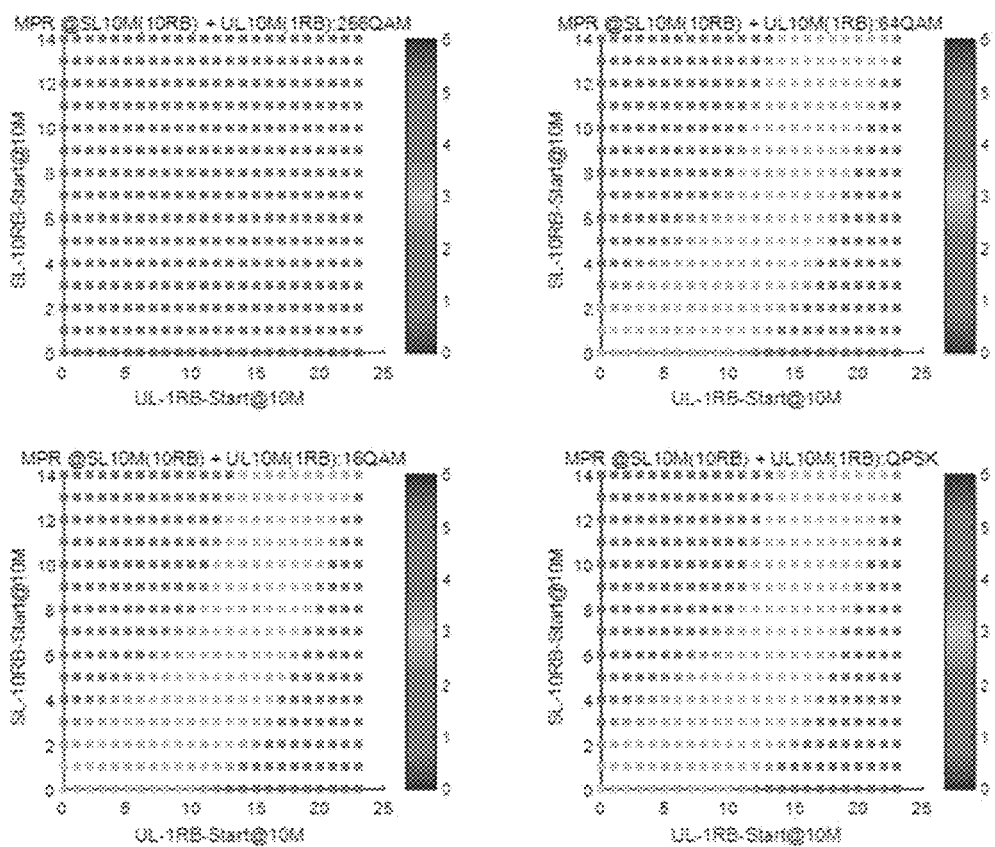
FIG. 9 illustrates an example of first simulation result according to an embodiment of the present disclosure.
Figure 10:
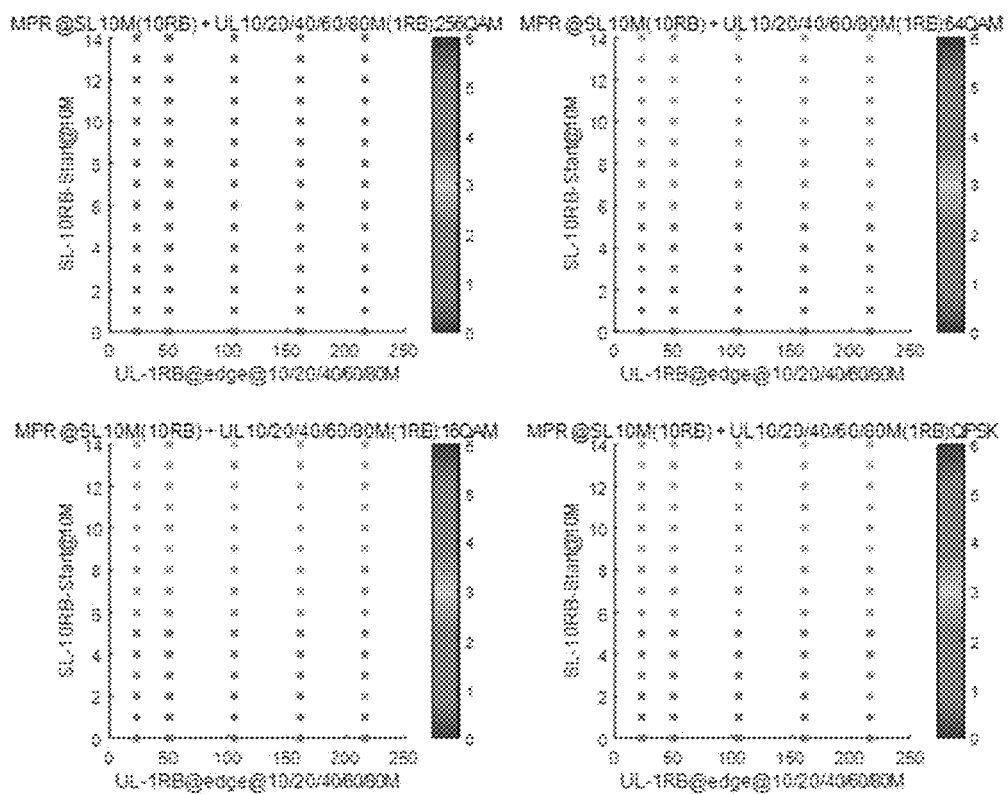
FIG. 10 illustrates an example of second simulation result according to an embodiment of the present disclosure.
Figure 11:
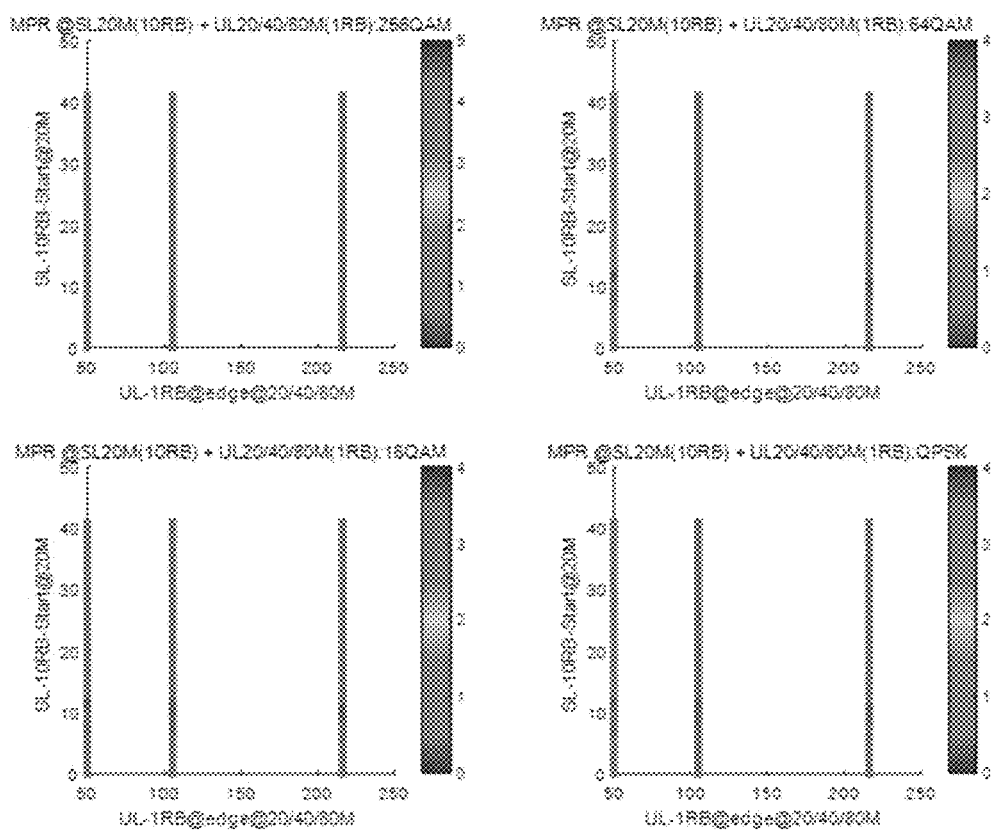
FIG. 11 illustrates an example of third simulation result according to an embodiment of the present disclosure.

For example, FIGS. 9 to 11 show simulation results of MPR with maximum total output power of 26 dBm assuming 23 dBm 2 PAs. The following shows detailed conditions for the simulation results of each figures. Each figures also shows simulation results for different modulation orders, for example, QPSK, 16QAM, 64 QAM, 256 QAM.

FIG. 9: 10 MHz(NR SL)+10 MHz(NR Uu)
FIG. 10: 10 MHz(NR SL)+10/20/40/60/80 MHz(NR Uu)
FIG. 11: 20 MHz(NR SL)+20/40/80 MHz(NR Uu)

For example, for FIGS. 9 to 11, horizontal axis means frequency location, based on unit of RB, of 1 RB for UL transmission (i.e. transmission of NR Uu signal) from the lower edge of configured CBW for NR Uu. Configured CBW for NR Uu may respectively be 10 MHz, 10/20/40/60/80 MHz, 20/40/80 MHz for FIGS. 9 to 11. For reference, horizontal axis of FIG. 11 starts from starting index of 51, which is upper edge of the UL CBW.

For example, for FIGS. 9 to 11, vertical axis means frequency location, based on unit of RB, of 10 RB for SL transmission (i.e. transmission of NR SL signal) from the lower edge of configured CBW for NR SL. Configured CBW for NR Uu may respectively be 10 MHz, 10 MHz, 20 MHz, for FIGS. 9 to 11.

For FIG. 9, when UL CBW is configured as 10 MHz, 1 RB of UL transmission was started from lower edge of configured CBW to upper edge of CBW. For FIGS. 10 and 11, 1 RB of UL transmission is allocated at the upper edge of UL CBW, and 10 RB for SL transmission was started from the lower edge of CBW to upper edge of CBW.

Figure 12:
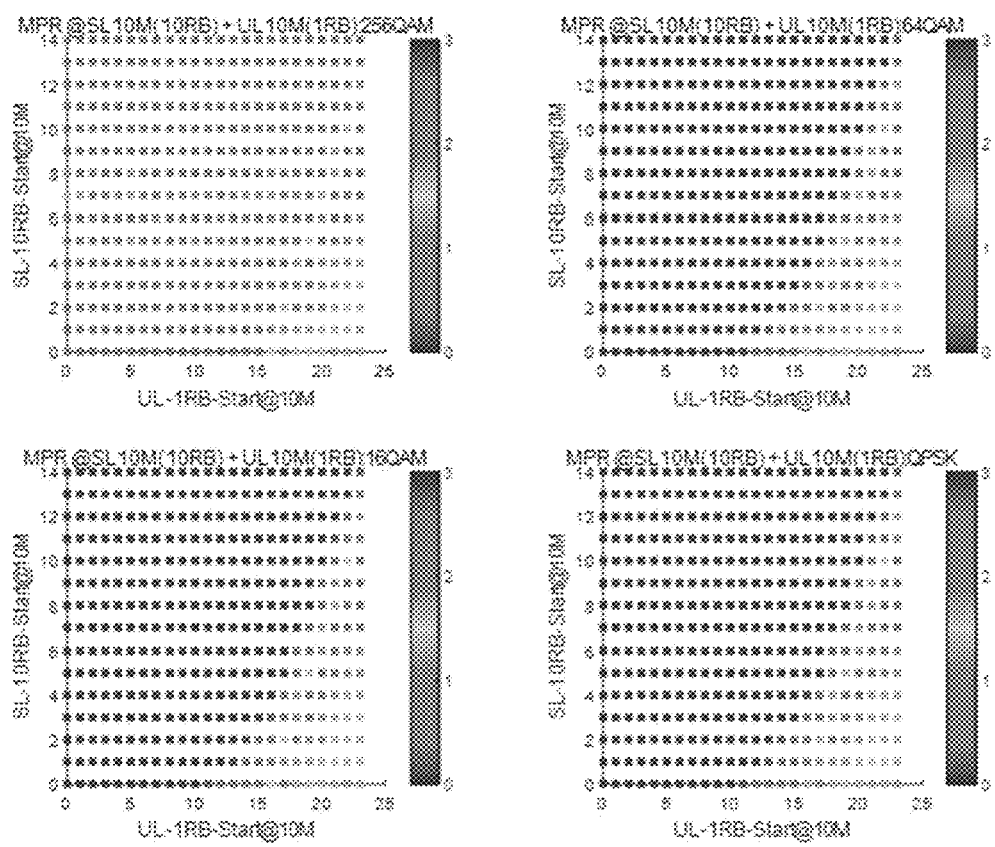
FIG. 12 illustrates an example of fourth simulation result according to an embodiment of the present disclosure.
Figure 13:
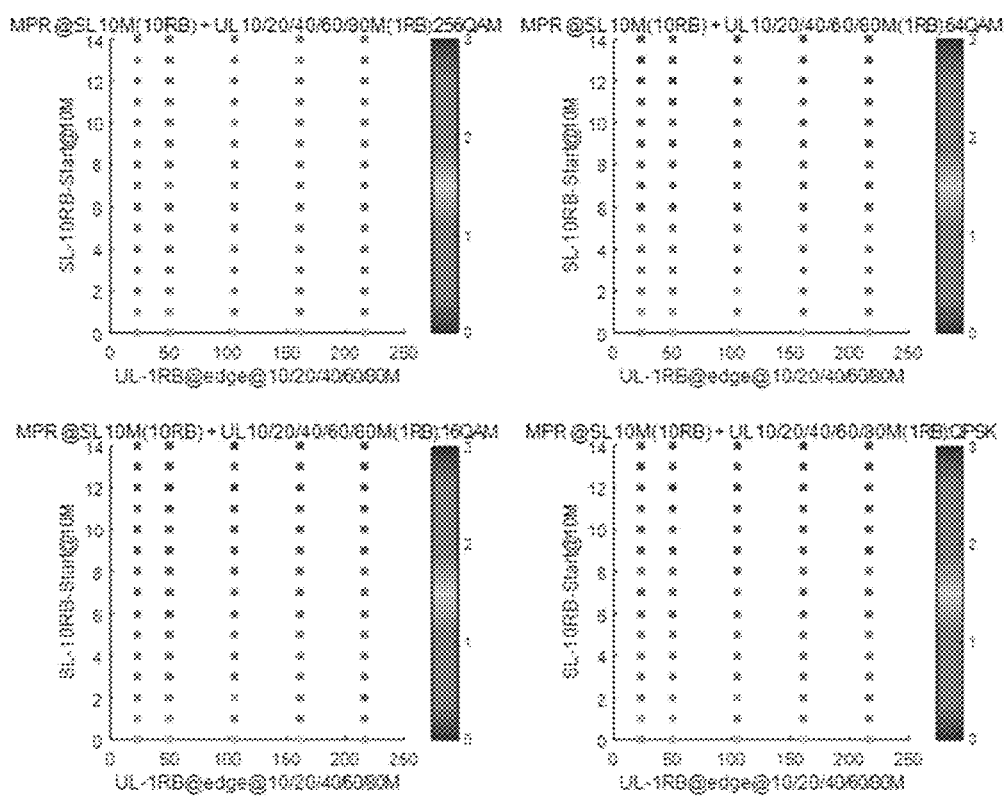
FIG. 13 illustrates an example of fifth simulation result according to an embodiment of the present disclosure.
Figure 14:
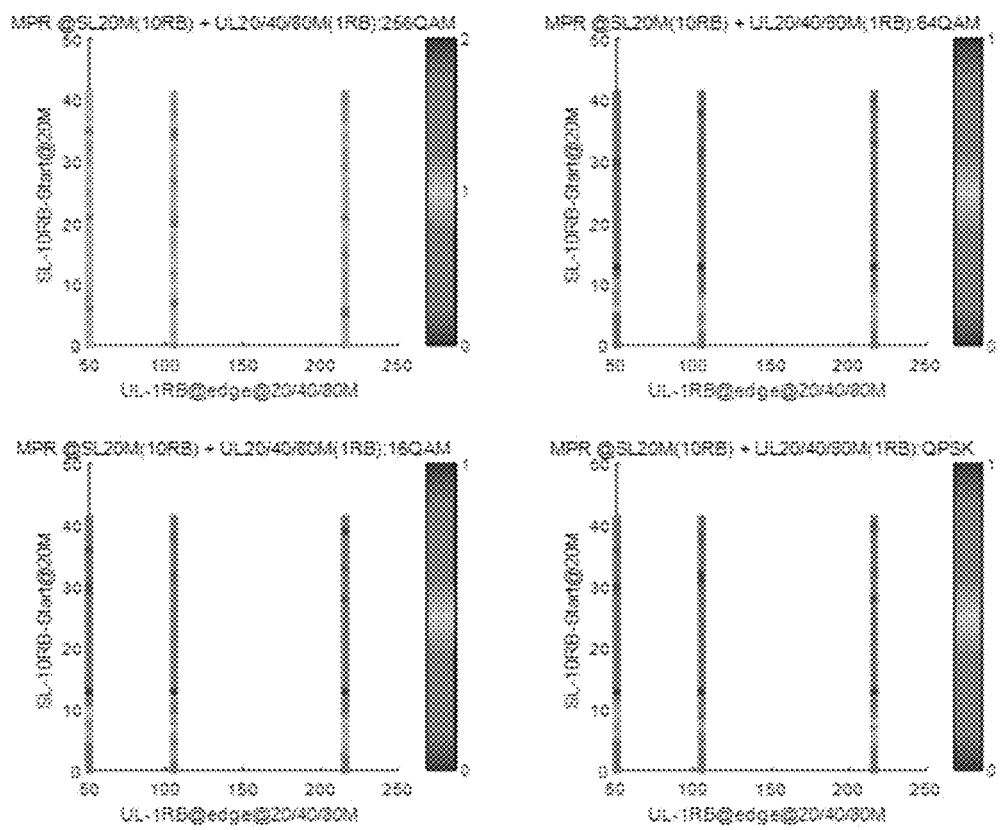
FIG. 14 illustrates an example of sixth simulation result according to an embodiment of the present disclosure.

For example, FIGS. 12 to 14 show simulation results of MPR with maximum total output power of 23 dBm after basically applying back off of 3 dB to 23 dBm 2 PAs. The following shows detailed conditions for the simulation results of each figures. Each figures also shows simulation results for different modulation orders, for example, QPSK, 16QAM, 64 QAM, 256 QAM.

FIG. 12: 10 MHz(NR SL)+10 MHz(NR Uu)
FIG. 13: 10 MHz(NR SL)+10/20/40/60/80 MHz(NR Uu)
FIG. 14: 20 MHz(NR SL)+20/40/80 MHz(NR Uu)

For example, for FIGS. 12 to 14, horizontal axis means frequency location, based on unit of RB, of 1 RB for UL transmission (i.e. transmission of NR Uu signal) from the lower edge of configured CBW for NR Uu. Configured CBW for NR Uu may respectively be 10 MHz, 10/20/40/60/80 MHz, 20/40/80 MHz for FIGS. 12 to 14.

For example, for FIGS. 9 to 11, vertical axis means frequency location, based on unit of RB, of 10 RB for SL transmission (i.e. transmission of NR SL signal) from the lower edge of configured CBW for NR SL. Configured CBW for NR Uu may respectively be 10 MHz, 10 MHz, 20 MHz, for FIGS. 12 to 14.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 9 illustrates an example of first simulation result according to an embodiment of the present disclosure.

FIG. 9 shows the first simulation result of MPR for 10 MHz(SL)+10 MHz(UL) @Max.Total.Power=26 dBm. That is, FIG. 9 shows examples of simulation of MPR for a case in which 10 MHz CBW is configured for SL, 10 MHz CBW is configured for UL, and maximum total power is 26 dBm.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 10 illustrates an example of second simulation result according to an embodiment of the present disclosure.

FIG. 10 shows the second simulation result of MPR for 10 MHz(SL)+10/20/40/60/80 MHz(UL)@Max.Total.Power=26 dBm. That is, FIG. 10 shows examples of simulation of MPR for a case in which 10 MHz CBW is configured for SL, 10/20/40/60/80 MHz CBW is configured for UL, and maximum total power is 26 dBm.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 11 illustrates an example of third simulation result according to an embodiment of the present disclosure.

FIG. 11 shows the third simulation result of MPR for 10 MHz(SL)+20/40/80 MHz (UL)@Max.Total.Power=26 dBm. That is, FIG. 11 shows examples of simulation of MPR for a case in which 10 MHz CBW is configured for SL, 20/40/80 MHz CBW is configured for UL, and maximum total power is 26 dBm.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 illustrates an example of fourth simulation result according to an embodiment of the present disclosure.

FIG. 12 shows the fourth simulation result of MPR for 10 MHz(SL)+10 MHz (UL) @Max.Total.Power=23 dBm. That is, FIG. 13 shows examples of simulation of MPR for a case in which 10 MHz CBW is configured for SL, 10 MHz CBW is configured for UL, and maximum total power is 23 dBm.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 13 illustrates an example of fifth simulation result according to an embodiment of the present disclosure.

FIG. 13 shows the fourth simulation result of MPR for 10 MHz(SL)+10/20/40/60/80 MHz (UL)@Max.Total.Power=23 dBm. That is, FIG. 13 shows examples of simulation of MPR for a case in which 10 MHz CBW is configured for SL, 10/20/40/60/80 MHz CBW is configured for UL, and maximum total power is 23 dBm.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 14 illustrates an example of sixth simulation result according to an embodiment of the present disclosure.

FIG. 14 shows the fourth simulation result of MPR for 10 MHz(SL)+20/40/80 MHz (UL)@Max.Total.Power=23 dBm. That is, FIG. 13 shows examples of simulation of MPR for a case in which 10 MHz CBW is configured for SL, 20/40/80 MHz CBW is configured for UL, and maximum total power is 23 dBm.

Figure 15:
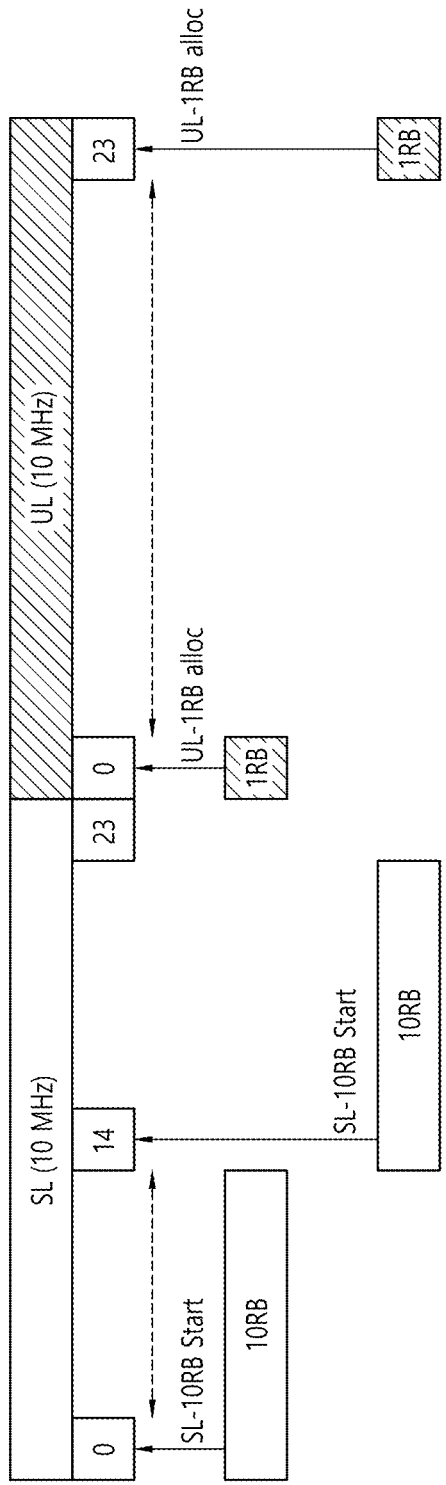
FIG. 15 illustrates an example of position of allocated resource blocks according to an embodiment of the present disclosure.

Related to "the position of allocated SL-10 RB-Start and allocated UL-1 RB" of FIG. 9 and FIG. 12, detailed examples are shown in FIG. 15.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 15 illustrates an example of position of allocated resource blocks according to an embodiment of the present disclosure.

FIG. 15 shows the position of allocated SL-10 RB-Start and allocated UL-1 RB in FIG. 9 and FIG. 12.

As shown in the example of FIG. 15, 24 RBs can be allocated in 10 MHz of CBW.

For example, 10 RBs for SL is allocated from the position of "0", which is the left edge of 10 MHz of CBW in SL, to the position of "14" when the simulation is being performed.

For example, 1 RBs for UL is allocated from the position of "0", which is the left edge of 10 MHz of CBW in UL, to the position of "23", which is the right edge, when the simulation is being performed.

From the simulation results shown in examples of FIGS. 9 to 14, followings are observed.

Observation 1: In most cases, required MPR is higher when min. RB of SL(10 PRB) and UL(1 PRB) are allocated at either left or right edge of allocated channel bandwidth compared to other cases.

Observation 2: The higher the modulation order is, the smaller the difference of MPR according to allocated RB positions. For example, in case of maximum total power of 26 dBm, the difference of MPR is about 1 dB in case of 256QAM, however, it is enlarged to about 4 dB in case of QPSK and 16QAM.

Observation 3: For 2 PAs with 23 dBm per PA, the case that maximum total power is restricted to 23 dBm requires less MPR than the case that maximum total power is not restricted but allowed to 26 dBm.

NR V2X intra-band con-current transmission (i.e. simultaneous transmission of NR Uu signal and NR SL signal) is similar to intra-band contiguous EN-DC case rather than intra-band contiguous Carrier Aggregation (CA) in aspect of UE architecture. The reason is that single PA was assumed to be used to derive MPR for intra-band contiguous CA and 2 PAs was assumed to be used to derive MPR for for intra-band contiguous EN-DC.

In 3GPP TS38.101-3 V16.6.0, MRP requirements for the intra-band contiguous EN-DC was specified without differentiating per Modulation Order as the following table 8. Detailed explanation for parameters shown in table 8 is described in 3GPP TS38.101-3 V16.6.0.

TABLE 8

6.2B.2 UE maximum output power reduction for DC
6.2B.2.0 General
The UE maximum output power reduction (MPR) specified in this clause applicable for UEs configured with EN-DC when NS_01 is indicated in the MCG and the SCG. The MPR applies subject to indication in the field modifiedMPRbehavior for the SCG.
6.2B.2.1 Intra-band contiguous EN-DC
6.2B.2.1.1 General
When the UE is configured for intra-band contiguous EN-DC, the UE determines the total allowed maximum output power reduction as specified in this clause.
For UE supporting dynamic power sharing the following:
   for the MCG, $MPR_c$ in accordance with TS 36.101 V16.8.0
   for the SCG, TABLE 8-continued $MPR'_c = MPR_{NR} = MAX(MPR_{single,NR}, MPR_{ENDC})$
  for the total configured transmission power,
$MPR_{tot} = P_{PowerClass,EN-DC} - \min(P_{PowerClass,EN-DC}, 10*\log_{10}(10^{((P_{PowerClass,E-UTRA} - MPR_{E-UTRA})/10)} + 10^{((P_{PowerClass,NR} - MPR_{NR})/10)}))$
where
$MPR_{E-UTRA} = MAX(MPR_{single,E-UTRA}, MPR_{ENDC})$
with
  $MPR_{single,E-UTRA}$ is the MPR defined for the E-UTRA transmission
  $MPR_{single,NR}$ is the MPR defined for the NR transmission
For UEs not supporting dynamic power sharing the following:
  for the MCG,
$MPR_c = MAX(MPR_{single,E-UTRA}, MPR_{ENDC})$
  for the SCG,
$MPR'_c = MAX(MPR_{single,NR}, MPR_{ENDC})$
where
  $MPR_{single,NR}$ is the MPR defined for the NR transmission
  $MPR_{single,E-UTRA}$ is the MPR defined for the E-UTRA transmission
$MPR_{ENDC}$ is defined in Clause 6.2B.2.1.2
6.2B.2.1.2 MPR for power class 3 and power class 2
MPR in this clause is applicable for power class 3 and power class 2 UEs indicating IE
dualPA-Architecture supported with EN-DC power class being the same as the E-UTRA
and NR power class, otherwise the UE can use as much MPR as needed to fulfil emissions
requirements when scheduled with dual uplink transmission. For UEs scheduled with single
uplink transmission, MPR is applied. For a UE supporting dynamic power sharing for
DC_(n)71AA for which dual simultaneous uplink transmissions are mandatory and A-MPR
defined in clause 6.2B.3.1.1 is applied as MPR. The allowed maximum output reduction
applied to transmission on the MCG and the SCG is defined as follows:
$MPR_{ENDC} = M_A$
Where $M_A$ is defined as follows
$M_A =$  15  ;  $0 \leq B < 0.5$
     10  ;  $0.5 \leq B < 1.0$
     8   ;  $1.0 \leq B < 2.0$
     6   ;  $2.0 \leq B$
Where:
For UEs supporting dynamic power sharing,
$B = (L_{CRB\_alloc,E-UTRA} * 12 * SCS_{E-UTRA} + L_{CRB\_alloc,NR} * 12 * SCS_{NR})/1,000,000$
For UEs not supporting dynamic power sharing,
For E-UTRA
$B = (L_{CRB\_alloc,E-UTRA} * 12 * SCS_{E-UTRA} + 12 * SCS_{NR})/1,000,000$
Where $SCS_{NR} = 15$ kHz is assumed in calculation of B.
For NR
$B = (12 * SCS_{E-UTRA} + L_{CRB\_alloc,NR} * 12 * SCSNR)/1,000,000$
Where $SCS_{E-UTRA} = 15$ kHz is assumed in calculation of B.
and $M_A$ is reduced by 1 dB for $B < 2$.

As mentioned in observation 2, MPR needs to be defined taking configured modulation order and RB allocation into account in addition to allocated RB sizes. Embodiments of the present disclosure proposes a first example of proposal: Define MPR for NR V2X intra-band con-current operation of SL PC5 and Uu taking configured Modulation Order and RB allocations into account.

Regarding minimum sub-channel size of 10 RB in SL, the parameter 'B' which is defined in Table 8 above can be calculated as the following:

$B = (MinSubChannel*12*SCS_{SL} + L_{CRB\_alloc,NR}*12*SCS_{NR})/1000000.$

Where, UE capable of SL and Uu is assumed not supporting dynamic power sharing regarding implementation of different chips for SL and Uu link.

Minimum value of B is calculated with MinSubChannel=10 RBs, $SCS_{SL}=15$ kHz, $SCS_{NR}=15$ kHz and $L_{CRB\_alloc,NR}=1$ RB as below.

$B = (10*12*15000 + 1*12*15000)/1000000 = 1.98$

In simulation, B of 3.96 is assumed for $SCS_{SL}=30$ kHz, $SCS_{NR}=30$ kHz.

$B = (10*12*30000 + 1*12*30000)/1000000 = 3.96$

When considering all possible RB allocations, B is equal to or larger than about 2. In other words, $2.0 \leq B$ is enough so that it is not necessary to consider 'B' for MPR of NR V2X intra-band con-current operation.

Embodiments of the present disclosure proposes a second example of proposal: Do not consider the ratio of total RB allocations over 1 MHz ('B') for MPR for NR V2X intra-band con-current operation of SL and Uu Link.

Based on the simulation results, the present disclosure proposes MPR in Table 9 and Table 10 for maximum total output power of 26 dBm and MPR in Table 11 and Table 12 for maximum total output power of 23 dBm.

Table 9 and Table 10 show MPR in contiguous RB allocation and in non-contiguous RB allocation for maximum total output power of 26 dBm.

TABLE 9

| | | MPR for bandwidth class B(dB) | |
|---|---|---|---|
| Modulation | | inner | outer |
| CP-OFDM | QPSK | ≤1.5 | ≤3.5 |
| | 16 QAM | ≤2.0 | ≤3.5 |
| | 64 QAM | ≤3.0 | ≤3.5 |
| | 256 QAM | ≤5.0 | ≤5.0 |

Note:
Bandwidth class B is that the aggregated channel bandwidth 20 MHz ≤ $BW_{Channel\_SL\&UL}$ ≤ 100 MHz.

Table 9 shows contiguous RB allocation for maximum total output power of 26 dBm (Power Class 2). Table 9 shows an example of MPR for bandwidth class B based on RB allocation (e.g. inner RB allocation and outer RB allocation) and modulation.

For bandwidth class B with contiguous RB allocation in Table 9, the following parameters are defined to specify valid RB allocation ranges for Inner and Outer RB allocations:

An RB allocation is contiguous if $L_{CRB1}=0$ or $L_{CRB2}=0$ or ($L_{CRB1\_1}$ 0 and $L_{CRB2\_1}$ 0 and $RB_{Start1}+L_{CRB1}=N_{RB1}$ and $RB_{Start2}=0$), where $RB_{Start1}$, $L_{CRB1}$, and $N_{RB1}$ are for SL CC1, $RB_{Start2}$, $L_{CRB2}$, and $N_{RB2}$ are for UL CC2. SL CC1 is the component carrier with lower frequency. $RB_{Start1}$ may mean starting index of RB configured for SL. $L_{CRB1}$ may mean number of RBs allocated for SL. $N_{RB1}$ may mean number of RBs corresponding to channel bandwidth for SL. $RB_{Start2}$, may mean starting index of RB configured for UL. $L_{CRB2}$ may mean number of RBs allocated for UL. $N_{RB2}$ may mean number of RBs corresponding to channel bandwidth for UL.

In contiguous NR V2X intra-band con-current operation, a contiguous allocation is an inner allocation if $$RB_{Start,Low} \leq RB_{Start\_SL\&UL} \leq RB_{Start,High}, \text{ and}$$
$$N_{RB\_alloc} \leq \text{ceil}(N_{RB,agg}/2),$$

where $$RB_{Start,Low}=\max(1,\text{floor}(N_{RB\_alloc}/2))$$

$$RB_{Start,High}=N_{RB,agg}-RB_{Start,Low}-N_{RB,aloc},$$

with $$N_{RB\_alloc}=L_{CRB1}*2^{\mu 1}+L_{CRB2}*2^{\mu 2}$$

$$N_{RB\_aloc}=(N_{RB1}-RB_{Start1})*2^{\mu 1}+(RB_{Start2}+L_{CRB2})*2^{\mu 2},$$

$$N_{RB,agg}=N_{RB1}\cdot 2^{\mu 1}+N_{RB2}\cdot 2^{\mu 2}.$$

If $L_{CRB1}=0$, $RB_{Start\_SL\&UL}=N_{RB1}\cdot 2^{\mu 1}+RB_{Start2}\cdot 2^{\mu 2}$, if $L_{CRB1}>0$, $RB_{Start\_SL\&UL}=RB_{Start1}\cdot 2^{\mu 1}$.

Where, μ1 and μ2 is 0, 1 and 2 for SCS of 15 kHz, 30 kHz and 60 kHz respectively.

A contiguous allocation that is not an Inner contiguous allocation is an Outer contiguous allocation.

TABLE 10

| | | MPR for bandwidth class B(dB) | | |
|---|---|---|---|---|
| Modulation | | inner | Outer[1] | Outer[2] |
| CP-OFDM | QPSK | ≤2.0 | ≤4.0 | ≤6.0 |
| | 16 QAM | ≤2.5 | ≤4.0 | ≤6.0 |
| | 64 QAM | ≤3.5 | ≤4.5 | ≤6.0 |
| | 256 QAM | ≤4.5 | ≤5.0 | ≤6.0 |

Note:
Bandwidth class B is that the aggregated channel bandwidth 20 MHz ≤ $B_{Channel\_SL\&UL}$ ≤ 100 MHz.

Table 10 shows Non-contiguous RB allocation for maximum total output power of 26 dBm (Power Class 2). Table 10 shows an example of MPR for bandwidth class B based on RB allocation (e.g. inner RB allocation, outer[1] RB allocation, and outer[2] RB allocation) and modulation.

For bandwidth classes B with non-contiguous RB allocation, the following parameters are defined to specify valid RB allocation ranges for Inner, Outer1 and Outer2 RB allocations:

Non-Contiguous RB allocation is defined as $RB_{Start1}+L_{CRB1}<N_{RB1}$, or $RB_{Start2}>0$, when both SL CC and UL CC are activated and allocated with RB(s), where $RB_{Start1}$, $L_{CRB1}$, and $N_{RB1}$ are for SL CC1, $RB_{Start2}$, $L_{CRB2}$, and $N_{RB2}$ are for UL CC2. SL CC1 is the component carrier with lower frequency.

In contiguous NR V2X intra-band con-current operation, a non-contiguous RB allocation is a non-contiguous Inner RB allocation if the following conditions are met:

$$RB_{Start,Low} \leq RB_{Start\_CA} \leq RB_{Start,High} \text{ and}$$
$$N_{RB\_alloc} \leq \text{ceil}((BW_{Channel\_SL\&UL}/3-BW_{gap})/0.18 \text{ MHz}),$$

where $$N_{RB\_aloc}=(N_{RB1}-RB_{Start1})*2^{\mu 1}+(RB_{Start2}+L_{CRB2})*2^{\mu 2},$$
$$RB_{Start\_SL\&UL}=RB_{Start1}2^{m1}$$

$$RB_{Start,Low}=\max(1,\text{floor}(N_{RB\_alloc}+(BW_{gap}-BW_{GB,low})/0.18 \text{ MHz}))$$

$$RB_{Start,High}=\text{floor}((BW_{Channel\_SL\&UL}-2*BW_{gap}-BW_{GB,low})/0.18 \text{ MHz}-2*N_{RB\_alloc})$$

$$BW_{GB,low}=F_{offset,low}-(N_{RB1}\cdot 12+1)\cdot SCS_1/2$$

$BW_{gap}$ is the bandwidth of the gap between $N_{RB1}$ and $N_{RB2}$ possible allocations of SL CC1 and UL CC2 respectively.

In contiguous NR V2X intra-band con-current operation, a non-contiguous RB allocation is a non-contiguous outer 1 RB allocation if the following conditions are met:

$$RB_{Start,Low} \leq RB_{Start\_SL\&UL} \leq RB_{Start,High} \text{ and}$$
$$N_{RB\_alloc} \leq \text{ceil}((3BW_{Channel\_SL\&UL}/5-BW_{gap})/0.18 \text{ MHz})$$

where $$RB_{Start,Low}=\max(1,2*N_{RB\_alloc}-\text{floor}((BW_{Channel\_SL\&UL}-2*BW_{gap}+BW_{GB,low})/0.18 \text{ MHz})),$$

$$RB_{Start,High}=\text{floor}((2*BW_{Channel\_SL\&UL}-3*BW_{gap}-BW_{GB,low})/0.18 \text{ MHz}-3*N_{RB\_alloc})$$

$N_{RB\_alloc}$, $RB_{Start\_SL\&UL}$, $BW_{gap}$ and $BW_{GB,low}$ are as defined for the Inner region.

In contiguous NR V2X intra-band con-current operation, a non-contiguous allocation is an Outer 2 allocation if it is neither an non-contiguous Inner allocation nor an Outer 1 allocation.

Following Table 11 and Table 12 show MPR in contiguous RB allocation and in non-contiguous RB allocation for maximum total output power of 23 dBm.

TABLE 11

| | | MPR for bandwidth class B(dB) | |
|---|---|---|---|
| Modulation | | inner | outer |
| CP-OFDM | QPSK | ≤1.0 | ≤1.0 |
| | 16 QAM | ≤1.0 | ≤1.0 |
| | 64 QAM | ≤1.0 | ≤1.0 |
| | 256 QAM | ≤1.5 | ≤1.5 |

Note:
Bandwidth class B is that the aggregated channel bandwidth 20 MHz ≤ $BW_{Channel\_SL\&UL}$ ≤ 100 MHz.

Table 11 shows Contiguous RB allocation for maximum total output power of 23 dBm (Power Class 3). Table 11 shows an example of MPR for bandwidth class B based on RB allocation (e.g. inner RB allocation and outer RB allocation) and modulation.

TABLE 12

| Modulation | | MPR for bandwidth class B(dB) | | |
|---|---|---|---|---|
| | | inner | Outer[1] | Outer[2] |
| CP-OFDM | QPSK | ≤1.0 | ≤1.5 | ≤3.0 |
| | 16 QAM | ≤1.0 | ≤1.5 | ≤3.0 |
| | 64 QAM | ≤1.0 | ≤1.5 | ≤3.0 |
| | 256 QAM | ≤1.5 | ≤2.0 | ≤3.0 |

Note:
Bandwidth class B is that the aggregated channel bandwidth 20 MHz ≤ $BW_{Channel\_SL\&UL}$ ≤ 100 MHz.

Table 12 shows Non-contiguous RB allocation for maximum total output power of 23 dBm (Power Class 3). Table 12 shows an example of MPR for bandwidth class B based on RB allocation (e.g. inner RB allocation and outer RB allocation) and modulation.

Embodiments of the present disclosure proposes a third example of proposal: Specify MPR in Table 9 and Table 10 for NR V2X intra-band con-current operation for maximum total output power of 26 dBm.

Embodiments of the present disclosure proposes a fourth example of proposal: Specify MPR in Table 11 and Table 12 for NR V2X intra-band con-current operation for maximum total output power of 23 dBm.

Embodiments of the present disclosure proposes a fifth example of proposal: The MPR in Table 9, Table 10, Table 11, and Table 12 could have ±α tolerance. α can be 0, 0.1, 0.2, 0.3, ..., 2.0.

Above mentioned examples of proposal may be applied to a terminal supporting both NR SL PC5 and NR Uu.

Additionally, MPR may be defined differently depending on the case in which the SL power control operates based on the DL path loss and the case in which the SL power control operates based on the SL path loss.

In general, MPR is defined as the difference between Tx Power, which satisfies all of ACLR (Adjacent Channel Leakage Ratio), SEM (Spectrum Emission Mask), SE (Spurious Emission), and EVM (Error Vector Magnitude), and Tx power corresponding to the power class of a terminal.

Here, ACLR, SEM, and SE standards may be determined based on aggregated channel band width (CBW) of SL and UL.

The following drawings are prepared to explain a specific example of the present specification. Since the names of specific devices or names of specific signals/messages/fields described in the drawings are provided by way of example, technical features of the present specification are not limited to specific names used in the following drawings.

Figure 16:
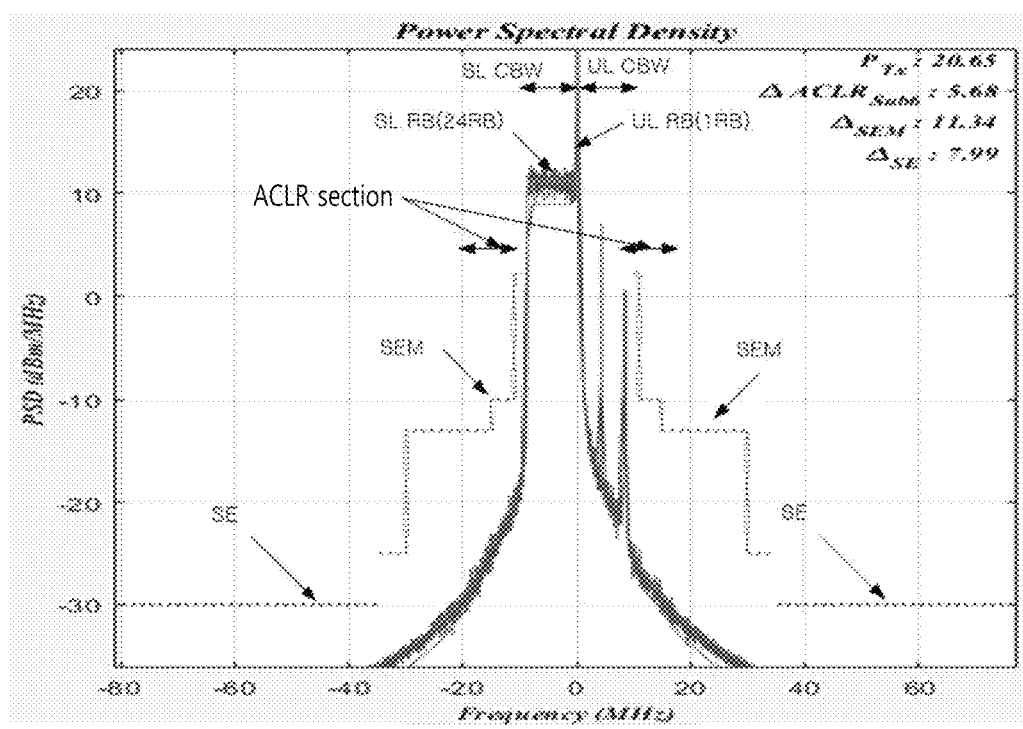
FIG. 16 illustrates an example of power spectral density according to an embodiment of the present disclosure.

FIG. 16 illustrates an example of power spectral density according to an embodiment of the present disclosure.

FIG. 16 shows an example of Tx power PSD for simultaneous transmission of SL signal and UL signal.

FIG. 16 shows the total power PSD (power spectrum density) of {SL+UL} for the case where SL CBW=10 MHz, UL CBW=10 MHz, and 1024 RB for SL and 1 RB for UL are set adjacent to each other.

FIG. 16 shows an example of PSD that satisfies ACLR requirements with a margin of 5.68 dB compared to the standard, satisfies SEM requirements with a margin of 11.34 dB compared to the standard, and satisfies SE requirements with a margin of 7.99 dB compared to the standard.

In detail, simulation of the PSD shown in FIG. 16 can be explained based on the following description:
SL RBs=24 RB @SL CBW=10 MHz
UL RB=1 RB @UL CBW=10 MHz
$P_{Tx}$=Total UE Tx power=SL Tx power+UL Tx power=20.65 dBm
MPR=23 dBm (PC3 UE PA power)−20.65 dBm=2.35 dB
Here, $P_{Tx}$ is a value that satisfies all of ACLR, SEM, SE and EVM.
ACLR=30 dB,
ACLR_Power_Ref=23 dBm(PC3 UE PA power)−30 dB(ACLR)=−7 dBm
ACLR_Power_Ref=−7 dBm @frequency range, −20 MHz≤$\Delta f_{OOB}$<−10 MHz & 10 MHz≤$\Delta f_{OOB}$<20 MHz based on FIG. 8.
Measured ACLR Power=−12.68 dBm
ΔACLR is determined based on the Measured ACLR Power and ACLR_Power_Ref.
ΔACLR=ACLR_Power_Ref−Measured ACLR Power=−7 dBm−(−12.68 dBm)=5.68 dB
ACLR limit is satisfied based on a margin of 5.68 dB.
SEM=−13 dBm/kHz @frequency range, −1 MHz≤$\Delta f_{OOB}$<1 MHz based on FIG. 8,
−10 dBm/MHz @frequency range, −10 MHz≤$\Delta f_{OOB}$<−1 MHz & 1 MHz≤$\Delta f_{OOB}$<10 MHz,
−25 dBm/MHz@frequency range, −15 MHz≤$\Delta f_{OOB}$<−10 MHz & 10 MHz≤$\Delta f_{OOB}$<15 MHz.
Measured SEM=−21.34 dBm/MHz @frequency range, −10 MHz≤$\Delta f_{OOB}$<−1 MHz & 1 MHz≤$\Delta f_{OOB}$<10 MHz.
ΔSEM=SEM−Measured SEM=11.34 dB.
SEM limit is satisfied based on a margin of 11.34 dB.
SE=−30 dBm/MHz @frequency range, $\Delta f_{OOB}$<−15 MHz & $\Delta f_{OOB}$≥15 MHz based on FIG. 8.
Measure SE-37.99 dBm/MHz
ΔSE=SE−Measured SE=7.99 dB.
SE limit is satisfied based on a margin of 7.99 dB.
For EVM, FIG. 17 shows detailed example of simulation for EVM.

The following drawings are prepared to explain a specific example of the present specification. Since the names of specific devices or names of specific signals/messages/fields described in the drawings are provided by way of example, technical features of the present specification are not limited to specific names used in the following drawings.

Figure 17:
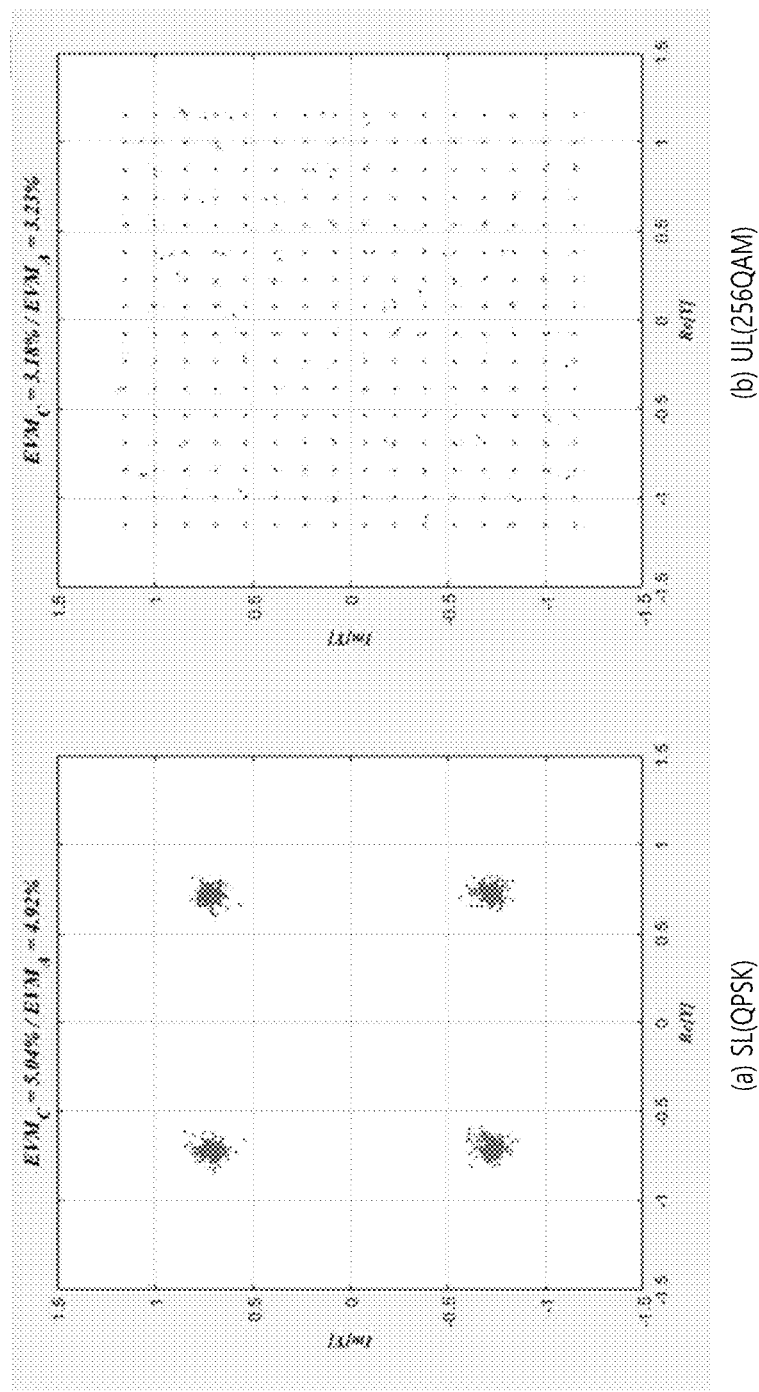
FIG. 17 illustrates an example of EVM according to an embodiment of the present disclosure.

FIG. 17 illustrates an example of EVM according to an embodiment of the present disclosure.

Refer to FIG. 17, both SL EVM and UL EVM are measured lower than reference EVM value, so that EVM limit is satisfied.

FIG. 17 shows an example of SL EVM(QPSK) & UL EVM(256QAM) for simultaneous transmission of SL and UL.

FIG. 17 is an example showing SL EVM and UL EVM when SL modulation order (MO)=QPSK and UL MO=256QAM in the above configuration. The standard EVM to be satisfied is QPSK (17.5%), 16QAM (12.5%), 64QAM (8%), and 256QAM (3.5%).

EVM (Error Vector Magnitude) defines the vector error between the actual ideal data and the measured data. For reference, in the case of QPSK, the ideal data is defined as the following: 0.707+i*0.707, 0.707−i*0.707, −0.707+i*0.707, −0.707−i*0.707.

In FIG. 17, $EVM_C$ is instantaneous EVM, $EVM_A$ is cumulative EVM, and EVM evaluation is based on cumulative $EVM_A$. In the case of FIG. 17 (a), $EVM_A$=4.92% is lower than the QPSK EVM standard of 17.5%, so EVM limit is satisfied. In the case of FIG. 17 (b), $EVM_A$=3.23% is lower than the 256QAM EVM standard of 3.5%, so EVM limit is satisfied. As a result, it can be determined that both the SL EVM and the UL EVM are satisfied.

Simulation results shown in FIG. 9 to FIG. 15 shows examples of MPR values satisfying ACLR, SEM, SE and EVM such as shown in FIG. 16 and FIG. 17. For example, MPR values shown in FIG. 9 to FIG. 15 are determined based on analysing ACLR, SEM, SE and EVM.

The terminal (e.g. UE) supporting simultaneous transmission of NR SL signal and NR Uu signal may perform power control based on MPR values explained above.

For example, the terminal may perform power control for SL based on DL path loss or SL path loss. For example, the case where the power control of SL performs based on DL path loss may be called as Case A in the present disclosure. The case where the SL power control performs based on the SL path loss may be called as Case B in the present disclosure.

Here, power control operations for Case A and Case B are explained in detail.

In case A,

The same power control may be applied to SL and UL. That is, the UE may perform power control in a same way for SL and UL.

When the UE transmits both SL signal and UL signal, the UE may determines SL Tx power and UL Tx power. The UE determines SL Tx power and UL Tx power based on SL initial reference Tx power, UL initial reference Tx power, MPR value, and power control based on DL path loss. The UE transmits SL signal and UL signal based on SL Tx power and UL Tx power.

Figure 18:
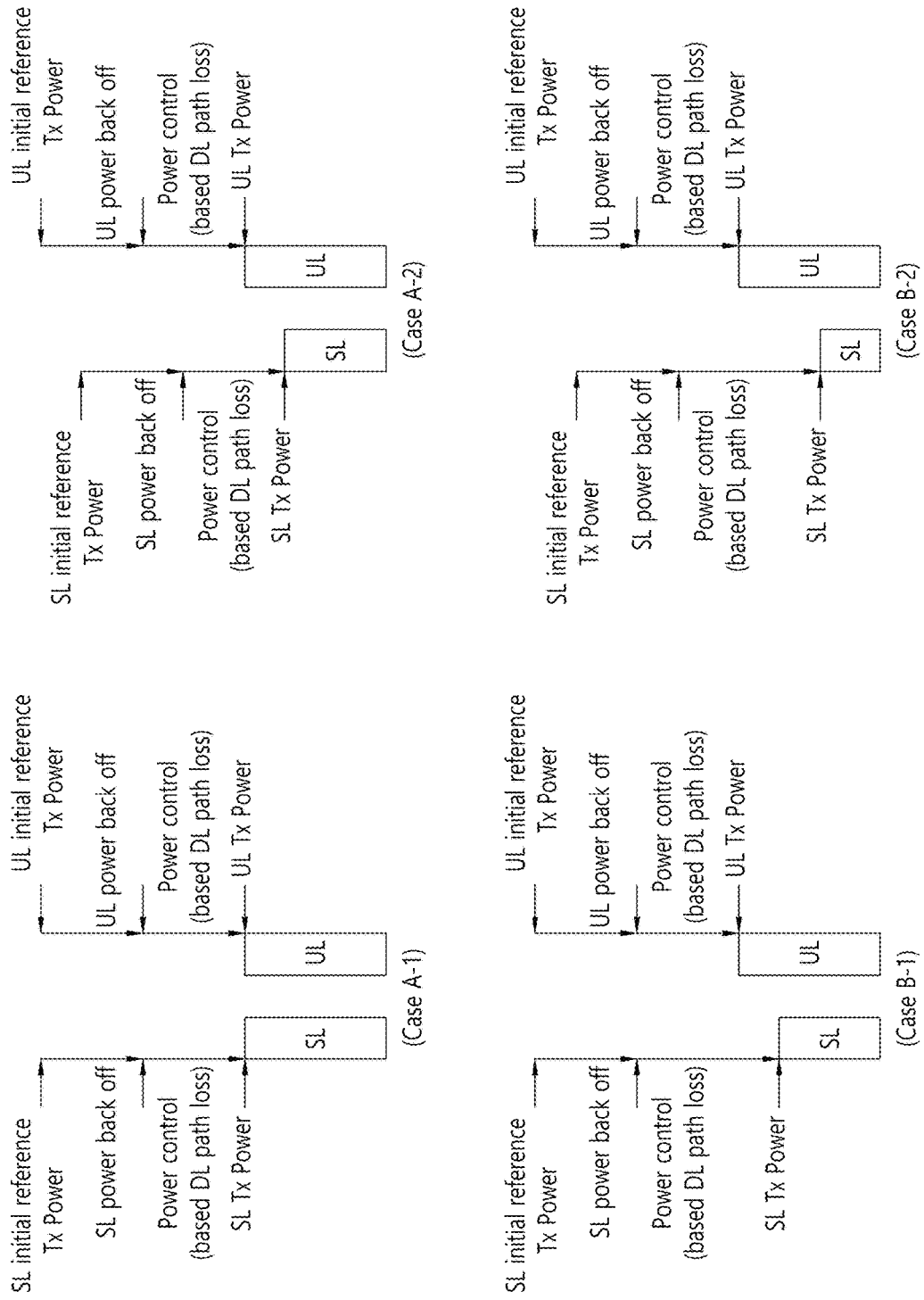
FIG. 18 illustrates examples of determining transmission power for various cases according to an embodiment of the present disclosure.

For example, in order to determine SL Tx power and UL Tx power, the UE applies MPR value based on SL initial reference Tx power and UL initial reference Tx power, after applying the MPR value, the UE applies power control based on DL path loss, such that SL Tx power and UL Tx power are determined. For example, SL Tx power and UL Tx power is determined based on applying MPR value and applying power control based on DL path loss with respect to SL initial reference Tx power and UL initial reference Tx power. The UE transmits SL signal and UL signal based on the determined SL Tx power and the determined UL Tx power. Detailed examples are shown in FIG. 18.

Here, MPR value means power back off value to satisfy ACLR (Adjacent Channel Leakage Ratio), SEM (Spectrum Emission Mask), SE (Spurious Emission), SL EVM and UL EVM.

Depending on whether the SL initial reference Tx Power and the UL initial reference Tx Power are the same, Case A may be divided into Case A-1 and Case A-2.

Case A-1: SL initial reference Tx Power=UL initial reference Tx Power, and same power control (DL path loss based power control) is applied.

Case A-2: SL initial reference Tx Power≠UL initial standard Tx Power, and same power control (DL path loss based power control) is applied.

Here, in both Case A-1 and Case A-2, SL MO and UL MO may assumed to be independent to each other.

In case B,

Different power control may be applied to SL and UL. That is, the UE may perform power control in a different way for SL and UL.

When the UE transmits both SL signal and UL signal, the UE may determines SL Tx power and UL Tx power. The UE determines SL Tx power and UL Tx power based on SL initial reference Tx power, UL initial reference Tx power, MPR value, power control based on SL path loss and power control based on DL path loss for UL. The UE transmits SL signal and UL signal based on SL Tx power and UL Tx power.

For example, in order to determine SL Tx power and UL Tx power, the UE applies MPR value based on SL initial reference Tx power and UL initial reference Tx power, after applying the MPR value, the UE applies power control based on DL path loss for the UL Tx power and the UE applies power control based on SL path loss for the SL Tx power, such that SL Tx power and UL Tx power are determined. That is, UL Tx power is determined based on applying MPR value and applying power control based on DL path loss with respect to UL initial reference Tx power. SL Tx power is determined based on applying MPR value and applying power control based on SL path loss with respect to SL initial reference Tx power. The UE transmits SL signal and UL signal based on the determined SL Tx power and the determined UL Tx power. Detailed examples are shown in FIG. 18.

Here, MPR value means power back off value to satisfy ACLR (Adjacent Channel Leakage Ratio), SEM (Spectrum Emission Mask), SE (Spurious Emission), SL EVM and UL EVM.

Depending on whether the SL initial reference Tx Power and the UL initial reference Tx Power are the same, Case B may be divided into Case B-1 and Case B-2.

Case B-1: SL initial standard Tx Power=UL initial standard Tx Power, and different power control (SL:SL path loss based, UL:DL path loss based) is applied.

Case B-2: SL initial standard Tx Power ≠UL initial standard Tx Power, and different power control (SL:SL path loss based, UL:DL path loss based) is applied.

Here, in both Case B-1 and Case B-2, SL MO and UL MO may assumed to be independent to each other.

FIG. 18 shows examples of Case A (A-1, A-2) and Case B (B-1, B-2) scenarios.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 18 illustrates examples of determining transmission power for various cases according to an embodiment of the present disclosure.

FIG. 18 shows examples of Case A (including cases A-1, A-2) and Case B (including cases B-1, B-2) scenarios.

As explained above, FIG. 18 shows examples of UE operation for determining SL Tx power and UL Tx power.

FIG. 18 shows examples for the following four cases:

Case A-1: SL initial reference Tx Power=UL initial reference Tx Power, and same power control (DL path loss based power control) is applied.

Case A-2: SL initial reference Tx Power≠UL initial standard Tx Power, and same power control (DL path loss based power control) is applied.

Case B-1: SL initial standard Tx Power=UL initial standard Tx Power, and different power control (SL: SL path loss based, UL: DL path loss based) is applied.

Case B-2: SL initial standard Tx Power≠UL initial standard Tx Power, and different power control (SL: SL path loss based, UL: DL path loss based) is applied.

Hereinafter, MPRs for Case A-1, Case A-2, Case B-1, and Case B-2 are explained. For example, based on that SL MO (modulation order) and UL MO are configured independently, MPRs based on the independently configured MOs are explained for four cases.

1. MPRs for Case A-1

In Case A-1,

For the MPRs, simulations were performed based on different combination of modulation order for SL and modulation order for UL with following simulation assumptions are below.

Considered simulation assumptions are shown in Table 13

TABLE 13

Channel BW configurations for bandwidth class B

10 MHz (NR SL, 30 kHz SCS) + 10 MHz (NR Uu, 30 kHz SCS)
WaveformCP-OFDM(NR SL) + CP-OFDM(NR Uu)
Maximum total output power26 dBm:23dBm 2 PAs
Modulation order{SL, UL} = {QPSK, QPSK/16 QAM/64 QAM/256 QAM}
  {16 QAM,   QPSK/16 QAM/64 QAM/256 QAM}
{64 QAM, QPSK/16 QAM/64 QAM/256 QAM}
{256 QAM, QPSK/16 QAM/64 QAM/256 QAM}
RB allocation Refer table 14 and table 15

In table 13, various combinations of MO for SL and MO for UL are considered in the simulation. For RB allocation of Table 13, examples of RB allocation considered for MPR simulation are shown in table 14 and table 15.

The following tables show simulation results of MPR with maximum total output power of 26 dBm assuming 23 dBm 2 PAs:
Table 14: MRR for contiguous RB allocation
Table 15: MPR for non-contiguous RB allocation.

TABLE 14

| SL Config. CBW(10 MHz):SCS(30 kHz) (L_CRB,StartRBidx) | UL Config. CBW(10 MHz):SCS(30 kHz) | | | MPR UL Modulation Order(MO) | | | |
|---|---|---|---|---|---|---|---|
| SL_RB | UL_RB | Inner/Outer | SL MO | QPSK | 16 QAM | 64 QAM | 256 QAM |
| (10,14) | (1,0) | Inner | QPSK | 0.13 | 0.43 | 1.47 | 3.14 |
| (10,14) | (13,0) | Inner | QPSK | 0.28 | 0.69 | 1.90 | 3.89 |
| (10,14) | (1,0) | Inner | 16 QAM | 0.84 | 0.81 | 1.48 | 3.18 |
| (10,14) | (13,0) | Inner | 16 QAM | 0.63 | 0.68 | 1.91 | 3.91 |
| (10,14) | (1,0) | Inner | 64 QAM | 2.08 | 2.15 | 2.08 | 3.04 |
| (10,14) | (13,0) | Inner | 64 QAM | 1.86 | 1.88 | 1.96 | 3.90 |
| (10,14) | (1,0) | Inner | 256 QAM | 4.06 | 4.07 | 4.11 | 4.02 |
| (10,14) | (13,0) | Inner | 256 QAM | 3.72 | 3.64 | 3.67 | 3.87 |
| (10,14) | (14,0) | Outer | QPSK | 0.40 | 0.77 | 2.00 | 3.91 |
| (10,14) | (24,0) | Outer | QPSK | 2.29 | 2.27 | 2.28 | 4.54 |
| (10,14) | (14,0) | Outer | 16 QAM | 0.63 | 0.75 | 1.99 | 3.98 |
| (10,14) | (24,0) | Outer | 16 QAM | 2.30 | 2.27 | 2.27 | 4.42 |
| (10,14) | (14,0) | Outer | 64 QAM | 1.82 | 1.86 | 2.00 | 3.95 |
| (10,14) | (24,0) | Outer | 64 QAM | 2.29 | 2.29 | 2.27 | 4.43 |
| (10,14) | (14,0) | Outer | 256 QAM | 3.73 | 3.64 | 3.69 | 3.99 |
| (10,14) | (24,0) | Outer | 256 QAM | 3.65 | 3.64 | 3.68 | 4.31 |

Table 14 shows MPR for contiguous RB allocation in 10 MHz(SL)+10 MHz(UL) @Max.Total.Power=26 dBm.

TABLE 15

| SL Config. CBW(10 MHz):SCS(30 kHz) (L_CRB,StartRBidx) | UL Config. CBW(10 MHz):SCS(30 kHz) | Inner/Outer1/ | | MPR UL Modulation Order(MO) | | | |
|---|---|---|---|---|---|---|---|
| SL_RB | UL_RB | Outer2 | SL MO | QPSK | 16 QAM | 64 QAM | 256 QAM |
| (10,14) | (1,2) | Inner | QPSK | 0.14 | 0.34 | 1.53 | 3.20 |
| (10,14) | (1,2) | Inner | 16 QAM | 0.68 | 0.66 | 1.40 | 3.10 |
| (10,14) | (1,2) | Inner | 64 QAM | 1.90 | 1.94 | 1.92 | 3.07 |
| (10,14) | (1,2) | Inner | 256 QAM | 3.85 | 3.86 | 3.86 | 3.86 |
| (10,14) | (14,3) | Outer1 | QPSK | 1.10 | 1.13 | 1.93 | 3.91 |
| (10,14) | (14,10) | Outer1 | QPSK | 2.46 | 2.47 | 2.44 | 3.70 |
| (10,14) | (14,3) | Outer1 | 16 QAM | 1.10 | 1.10 | 1.92 | 3.92 |
| (10,14) | (14,10) | Outer1 | 16 QAM | 2.46 | 2.49 | 2.46 | 3.66 |
| (10,14) | (14,3) | Outer1 | 64 QAM | 1.81 | 1.81 | 1.93 | 3.97 |
| (10,14) | (14,10) | Outer1 | 64 QAM | 2.46 | 2.44 | 2.47 | 3.73 |
| (10,14) | (14,3) | Outer1 | 256 QAM | 3.67 | 3.65 | 3.55 | 3.89 |
| (10,14) | (14,10) | Outer1 | 256 QAM | 3.64 | 3.58 | 3.64 | 3.68 |
| (10,9) | (1,12) | Outer2 | QPSK | 2.29 | 2.29 | 2.29 | 3.71 |

TABLE 15-continued

| SL Config. CBW(10 MHz):SCS(30 kHz) (L_CRB,StartRBidx) SL_RB | UL Config. CBW(10 MHz):SCS(30 kHz) UL_RB | Inner/Outer1/ Outer2 | SL MO | MPR UL Modulation Order(MO) | | | |
|---|---|---|---|---|---|---|---|
| | | | | QPSK | 16 QAM | 64 QAM | 256 QAM |
| (10,9) | (1,12) | Outer2 | 16 QAM | 2.29 | 2.32 | 2.32 | 4.30 |
| (10,9) | (1,12) | Outer2 | 64 QAM | 2.29 | 2.30 | 2.30 | 3.86 |
| (10,9) | (1,12) | Outer2 | 256 QAM | 3.81 | 3.85 | 3.92 | 4.08 |

Table 15 shows MPR for non-contiguous RB allocation in 10 MHz(SL)+10 MHz(UL) @Max.Total.Power=26 dBm.

From Table 14 and Table 15, it is observed that that MPR is different according to the combination of Modulation Order for SL and Modulation Order for UL.

Table 16 and Table 17 summarize the relative maximum difference of other MO combinations from a maximum MPR of {QPSK, QPSK}, based on MPRs shown in Table 14 and Table 15.

TABLE 16

| Inner/Outer | SL MO | Relative MPR from {QPSK, QPSK} UL Modulation Order(MO) | | | |
|---|---|---|---|---|---|
| | | QPSK | 16 QAM | 64 QAM | 256 QAM |
| Inner | QPSK | 0 | 0.41 | 1.62 | 3.61 |
| | 16 QAM | 0.56 | 0.53 | 1.63 | 3.63 |
| | 64 QAM | 1.8 | 1.87 | 1.8 | 3.62 |
| | 256 QAM | 3.78 | 3.79 | 3.83 | 3.74 |
| Outer | QPSK | 0 | −0.02 | 0.01 | 2.25 |
| | 16 QAM | 0.01 | −0.02 | −0.02 | 2.13 |
| | 64 QAM | 0 | 0 | −0.02 | 2.14 |
| | 256 QAM | 1.44 | 1.35 | 1.4 | 2.02 |

Table 16 shows examples of Relative maximum difference of other MO combinations from a maximum MPR of {QPSK, QPSK} for contiguous RB allocation in 10 MHz (SL)+10 MHz(UL)@Max.Total.Power=26 dBm.

TABLE 17

| Inner/Outer1/ Outer2 | SL MO | MPR UL Modulation Order(MO) | | | |
|---|---|---|---|---|---|
| | | QPSK | 16 QAM | 64 QAM | 256 QAM |
| Inner | QPSK | 0 | 0.2 | 1.39 | 3.06 |
| | 16 QAM | 0.54 | 0.52 | 1.26 | 2.96 |
| | 64 QAM | 1.76 | 1.8 | 1.78 | 2.93 |
| | 256 QAM | 3.71 | 3.72 | 3.72 | 3.72 |
| Outer 1 | QPSK | 0 | 0.01 | −0.02 | 1.45 |
| | 16 QAM | 0 | 0.03 | 0 | 1.46 |
| | 64 QAM | 0 | −0.02 | 0.01 | 1.51 |
| | 256 QAM | 1.21 | 1.19 | 1.18 | 1.43 |
| Outer2 | QPSK | 0 | 0 | 0 | 1.42 |
| | 16 QAM | 0 | 0.03 | 0.03 | 2.01 |
| | 64 QAM | 0 | 0.01 | 0.01 | 1.57 |
| | 256 QAM | 1.52 | 1.56 | 1.63 | 1.79 |

Table 17 shows examples of Relative maximum difference of other MO combinations from a maximum MPR of {QPSK, QPSK} for non-contiguous RB allocation in 10 MHz(SL)+10 MHz(UL)@Max.Total.Power=26 dBm.

Based on the differences shown in Table 16 and Table 17, the present disclosure considers 3 options for how to define MPR for intra-band con-current operation of NR SL and NR Uu in a licensed band. 3 options are shown as the following:

Option 1: Define MPR for all combination of modulation order between SL and UL

Option 2: Define MPR based on combination of SL modulation order and highest UL modulation order Option 3: Define MPR based on the highest MO between SL MO and UL MO For the above three options, MPRs may be determined based on the following descriptions:

For Option 1,

PC2 MPR can be updated as:

Table 18 for contiguous RB allocation taking Table 14 and Table 16 into account

Table 19 for non-contiguous RB allocation taking Table 15 and Table 17 into account.

PC3 MPR can be updated as:

Table 20 for contiguous RB allocation taking Table 14 and Table 16 on top of the difference between Table 11 and Table 9 into account Table 21 for non-contiguous RB allocation taking Table 15 and Table 17 on top of the difference between Table 12 and Table 10 into account.

For Option 2,

PC2 MPR can be updated as:

Table 22 for contiguous RB allocation taking Table 14 and Table 16 into account

Table 23 for non-contiguous RB allocation taking Table 15 and Table 17 into account.

PC3 MPR can be updated as:

Table 24 for contiguous RB allocation taking Table 14 and Table 16 on top of the difference between Table 11 and Table 9 into account Table 25 for non-contiguous RB allocation taking Table 15 and Table 17 on top of the difference between Table 12 and Table 10 into account.

For Option 3,

PC2 MPR can be updated as:

Table 26 for contiguous RB allocation taking Table 14 and Table 16 into account

Table 27 for non-contiguous RB allocation taking Table 15 and Table 17 into account.

PC3 MPR can be updated as:

Table 28 for contiguous RB allocation taking Table 14 and Table 16 on top of the difference between Table 11 and Table 9 into account Table 29 for non-contiguous RB allocation taking Table 15 and Table 17 on top of the difference between Table 12 and Table 10 into account.

TABLE 18

| | | MPR for bandwidth class B(dB) | | | | | | | |
|---|---|---|---|---|---|---|---|---|---|
| | Modulation | inner UL MO | | | | outer UL MO | | | |
| | SL MO | QPSK | 16 QAM | 64 QAM | 256 QAM | QPSK | 16 QAM | 64 QAM | 256 QAM |
| CP-OFDM | QPSK | ≤1.5 | ≤2.0 | ≤3.0 | ≤5.0 | ≤3.5 | ≤3.5 | ≤3.5 | ≤5.5 |
| | 16 QAM | ≤2.0 | ≤2.0 | ≤3.0 | ≤5.0 | ≤3.5 | ≤3.5 | ≤3.5 | ≤5.5 |
| | 64 QAM | ≤3.0 | ≤3.0 | ≤3.0 | ≤5.0 | ≤3.5 | ≤3.5 | ≤3.5 | ≤5.5 |
| | 256 QAM | ≤5.0 | ≤5.0 | ≤5.0 | ≤5.0 | ≤5.0 | ≤5.0 | ≤5.0 | ≤5.5 |

Table 18 shows examples of MPR based on contiguous RB allocation for Power Class 2 (Option 1).

TABLE 19

| | | MPR for bandwidth class (dB) | | | | | | | | | | | |
|---|---|---|---|---|---|---|---|---|---|---|---|---|---|
| | Modulation | inner UL MO | | | | Outer1 UL MO | | | | Outer2 UL MO | | | |
| | SL MO | QPSK | 16 QAM | 64 QAM | 256 QAM | QPSK | 16 QAM | 64 QAM | 256 QAM | QPSK | 16 QAM | 64 QAM | 256 QAM |
| CP-OFDM | QPSK | ≤2.0 | ≤2.0 | ≤3.0 | ≤5.0 | ≤4.0 | ≤4.0 | ≤4.0 | ≤5.5 | ≤6.0 | ≤6.0 | ≤6.0 | ≤6.5 |
| | 16 QAM | ≤2.5 | ≤2.5 | ≤3.0 | ≤5.0 | ≤4.0 | ≤4.0 | ≤4.0 | ≤5.5 | ≤6.0 | ≤6.0 | ≤6.0 | ≤6.5 |
| | 64 QAM | ≤3.5 | ≤3.5 | ≤3.5 | ≤5.0 | ≤4.5 | ≤4.5 | ≤4.5 | ≤5.5 | ≤6.0 | ≤6.0 | ≤6.0 | ≤6.5 |
| | 256 QAM | ≤5.5 | ≤5.5 | ≤5.5 | ≤5.5 | ≤5.5 | ≤5.5 | ≤5.5 | ≤5.5 | ≤6.5 | ≤6.5 | ≤6.5 | ≤6.5 |

Table 19 shows examples of MPR based on Non-Contiguous RB allocation for Power Class 2 (Option 1).

TABLE 20

| | | MPR for bandwidth class B(dB) | | | | | | | |
|---|---|---|---|---|---|---|---|---|---|
| | Modulation | inner UL MO | | | | outer UL MO | | | |
| | SL MO | QPSK | 16 QAM | 64 QAM | 256 QAM | QPSK | 16 QAM | 64 QAM | 256 QAM |
| CP-OFDM | QPSK | ≤1.0 | ≤1.0 | ≤1.0 | ≤2.0 | ≤1.0 | ≤1.0 | ≤1.0 | ≤2.5 |
| | 16 QAM | ≤1.0 | ≤1.0 | ≤1.0 | ≤2.0 | ≤1.0 | ≤1.0 | ≤1.0 | ≤2.5 |
| | 64 QAM | ≤1.0 | ≤1.0 | ≤1.0 | ≤2.0 | ≤1.0 | ≤1.0 | ≤1.0 | ≤2.5 |
| | 256 QAM | ≤2.0 | ≤2.0 | ≤2.0 | ≤2.0 | ≤2.0 | ≤2.0 | ≤2.0 | ≤2.5 |

Table 20 shows examples of MPR based on Contiguous RB allocation for Power Class 3 (Option 1).

TABLE 21

| | | MPR for bandwidth class B(dB) | | | | | | | | | | | |
|---|---|---|---|---|---|---|---|---|---|---|---|---|---|
| | Modulation | inner UL MO | | | | Outer1 UL MO | | | | Outer2 UL MO | | | |
| | SL MO | QPSK | 16 QAM | 64 QAM | 256 QAM | QPSK | 16 QAM | 64 QAM | 256 QAM | QPSK | 16 QAM | 64 QAM | 256 QAM |
| CP-OFDM | QPSK | ≤1.0 | ≤1.0 | ≤1.0 | ≤2.0 | ≤1.5 | ≤1.5 | ≤1.5 | ≤2.5 | ≤3.0 | ≤3.0 | ≤3.0 | ≤3.5 |
| | 16 QAM | ≤1.0 | ≤1.0 | ≤1.0 | ≤2.0 | ≤1.5 | ≤1.5 | ≤1.5 | ≤2.5 | ≤3.0 | ≤3.0 | ≤3.0 | ≤3.5 |
| | 64 QAM | ≤1.0 | ≤1.0 | ≤1.0 | ≤2.0 | ≤1.5 | ≤1.5 | ≤1.5 | ≤2.5 | ≤3.0 | ≤3.0 | ≤3.0 | ≤3.5 |
| | 256 QAM | ≤2.5 | ≤2.5 | ≤2.5 | ≤2.5 | ≤2.5 | ≤2.5 | ≤2.5 | ≤2.5 | ≤3.5 | ≤3.5 | ≤3.5 | ≤3.5 |

Table 21 shows examples of MPR based on Non-Contiguous RB allocation for Power Class 3 (Option 1).

TABLE 22

| Modulation | | MPR for bandwidth class B(dB) | |
|---|---|---|---|
| | | inner | outer |
| CP-OFDM | QPSK | ≤5.0 | ≤5.5 |
| | 16 QAM | ≤5.0 | ≤5.5 |
| | 64 QAM | ≤5.0 | ≤5.5 |
| | 256 QAM | ≤5.0 | ≤5.5 |

Table 22 shows examples of MPR based on Contiguous RB allocation for Power Class 2 (Option 2).

TABLE 23

| Modulation | | MPR for bandwidth class B(dB) | | |
|---|---|---|---|---|
| | | inner | Outer[1] | Outer[2] |
| CP-OFDM | QPSK | ≤5.0 | ≤5.5 | ≤6.5 |
| | 16 QAM | ≤5.0 | ≤5.5 | ≤6.5 |
| | 64 QAM | ≤5.0 | ≤5.5 | ≤6.5 |
| | 256 QAM | ≤5.5 | ≤5.5 | ≤6.5 |

Table 23 shows examples of MPR based on Non-Contiguous RB allocation for Power Class 2 (Option 2).

TABLE 24

| Modulation | | MPR for bandwidth class B(dB) | |
|---|---|---|---|
| | | inner | outer |
| CP-OFDM | QPSK | ≤2.0 | ≤2.5 |
| | 16 QAM | ≤2.0 | ≤2.5 |
| | 64 QAM | ≤2.0 | ≤2.5 |
| | 256 QAM | ≤2.0 | ≤2.5 |

Table 24 shows examples of MPR based on Contiguous RB allocation for Power Class 3 (Option 2).

TABLE 25

| Modulation | | MPR for bandwidth class B(dB) | | |
|---|---|---|---|---|
| | | inner | Outer[1] | Outer[2] |
| CP-OFDM | QPSK | ≤2.0 | ≤2.5 | ≤3.5 |
| | 16 QAM | ≤2.0 | ≤2.5 | ≤3.5 |
| | 64 QAM | ≤2.0 | ≤2.5 | ≤3.5 |
| | 256 QAM | ≤2.5 | ≤2.5 | ≤3.5 |

Table 25 shows examples of MPR based on Non-Contiguous RB allocation for Power Class 3 (Option 2).

TABLE 26

| Highest Modulation | | MPR for bandwidth class B(dB) | |
|---|---|---|---|
| of {SL MO, UL MO} | | inner | outer |
| CP-OFDM | QPSK | ≤1.5 | ≤3.5 |
| | 16 QAM | ≤2.0 | ≤3.5 |
| | 64 QAM | ≤3.0 | ≤3.5 |
| | 256 QAM | ≤5.0 | ≤5.5 |

Table 26 shows examples of MPR based on Contiguous RB allocation for Power Class 2 (Option 3).

TABLE 27

| Highest Modulation | | MPR for bandwidth class B(dB) | | |
|---|---|---|---|---|
| of {SL MO, UL MO} | | Inner | Outer1 | Outer2 |
| CP-OFDM | QPSK | ≤2.0 | ≤4.0 | ≤6.0 |
| | 16 QAM | ≤2.5 | ≤4.0 | ≤6.0 |
| | 64 QAM | ≤3.5 | ≤4.5 | ≤6.0 |
| | 256 QAM | ≤5.5 | ≤5.5 | ≤6.5 |

Table 27 shows examples of MPR based on Non-Contiguous RB allocation for Power Class 2 (Option 3).

TABLE 28

| Highest Modulation | | MPR for bandwidth class B(dB) | |
|---|---|---|---|
| of {SL MO, UL MO} | | inner | outer |
| CP-OFDM | QPSK | ≤1.0 | ≤1.0 |
| | 16 QAM | ≤1.0 | ≤1.0 |
| | 64 QAM | ≤1.0 | ≤1.0 |
| | 256 QAM | ≤2.0 | ≤2.5 |

Table 28 shows examples of MPR based on Contiguous RB allocation for Power Class 3 (Option 3).

TABLE 29

| Highest Modulation | | MPR for bandwidth class B(dB) | | |
|---|---|---|---|---|
| of {SLMO, UL MO} | | inner | Outer[1] | Outer[2] |
| CP-OFDM | QPSK | ≤1.0 | ≤1.5 | ≤3.0 |
| | 16 QAM | ≤1.0 | ≤1.5 | ≤3.0 |
| | 64 QAM | ≤1.0 | ≤1.5 | ≤3.0 |
| | 256 QAM | ≤2.5 | ≤2.5 | ≤3.5 |

Table 29 shows examples of MPR based on Non-Contiguous RB allocation for Power Class 3 (Option 3).

For the above Option 1, the present disclosure also proposes to apply individual MPR to SL and UL according to the MO combination of SL and UL in the following way:

MPR values for a case in which UL MO=QPSK in Table 18 to Table 21 are applied for SL MPR.

MPR values for a case in which SL MO=QPSK in Table 18 to Table 21 are applied For UL MPR.

For example, the following table 30 to 33 shows detailed examples for the above examples.

TABLE 30

| | | SL MPR and UL MPR for bandwidth class B(dB) | | | |
|---|---|---|---|---|---|
| | | Inner | | Outer | |
| | | SL MPR | UL MPR | SL MPR | UL MPR |
| CP-OFDM | QPSK | ≤1.5 | ≤1.5 | ≤3.5 | ≤3.5 |
| | 16 QAM | ≤2.0 | ≤2.0 | ≤3.5 | ≤3.5 |
| | 64 QAM | ≤3.0 | ≤3.0 | ≤3.5 | ≤3.5 |
| | 256 QAM | ≤5.0 | ≤5.0 | ≤5.0 | ≤5.5 |

Table 30 shows examples of of MPR based on Contiguous RB allocation for Power Class 2 (Option 1). Table 30 shows MPR values for SL MPR based on "UL MO=QPSK" and MPR values for UL MPR based on "SL MO=QPSK" in Table 18.

TABLE 31

| SL MPR and UL MPR for bandwidth class B(dB) | | | | | | |
|---|---|---|---|---|---|---|
| | | Inner | | Outer1 | | Outer2 | |
| | | SL MPR | UL MPR | SL MPR | UL MPR | SL MPR | UL MPR |
| CP-OFDM | QPSK | ≤2.0 | ≤2.0 | ≤4.0 | ≤4.0 | ≤6.0 | ≤6.0 |
| | 16 QAM | ≤2.5 | ≤2.0 | ≤4.0 | ≤4.0 | ≤6.0 | ≤6.0 |
| | 64 QAM | ≤3.5 | ≤3.0 | ≤4.5 | ≤4.0 | ≤6.0 | ≤6.0 |
| | 256 QAM | ≤5.5 | ≤5.0 | ≤5.5 | ≤5.5 | ≤6.5 | ≤6.5 |

Table 31 shows examples of of MPR based on Non-Contiguous RB allocation for Power Class 2 (Option 1). Table 31 shows MPR values for SL MPR based on "UL MO=QPSK" and MPR values for UL MPR based on "SL MO=QPSK" in Table 19.

TABLE 32

| SL MPR and UL MPR for bandwidth class B(dB) | | | | | |
|---|---|---|---|---|---|
| | | Inner | | Outer | |
| | | SL MPR | UL MPR | SL MPR | UL MPR |
| CP-OFDM | QPSK | ≤1.0 | ≤1.0 | ≤1.0 | ≤1.0 |
| | 16 QAM | ≤1.0 | ≤1.0 | ≤1.0 | ≤1.0 |
| | 64 QAM | ≤1.0 | ≤1.0 | ≤1.0 | ≤1.0 |
| | 256 QAM | ≤2.0 | ≤2.0 | ≤2.0 | ≤2.5 |

Table 32 shows examples of of MPR based on Contiguous RB allocation for Power Class 3 (Option 1). Table 32 shows MPR values for SL MPR based on "UL MO=QPSK" and MPR values for UL MPR based on "SL MO=QPSK" in Table 20.

TABLE 33

| SL MPR and UL MPR for bandwidth class B(dB) | | | | | | |
|---|---|---|---|---|---|---|
| | | Inner | | Outer1 | | Outer2 | |
| | | SL MPR | UL MPR | SL MPR | UL MPR | SL MPR | UL MPR |
| CP-OFDM | QPSK | ≤1.0 | ≤1.0 | ≤1.5 | ≤1.5 | ≤3.0 | ≤3.0 |
| | 16 QAM | ≤1.0 | ≤1.0 | ≤1.5 | ≤1.5 | ≤3.0 | ≤3.0 |
| | 64 QAM | ≤1.0 | ≤1.0 | ≤1.5 | ≤1.5 | ≤3.0 | ≤3.0 |
| | 256 QAM | ≤2.5 | ≤2.0 | ≤2.5 | ≤2.5 | ≤3.5 | ≤3.5 |

Table 33 shows examples of of MPR based on Non-Contiguous RB allocation for Power Class 3 (Option 1). Table 33 shows MPR values for SL MPR based on "UL MO=QPSK" and MPR values for UL MPR based on "SL MO=QPSK" in Table 21.

Based on examples described in this section (1. MPRs for Case A-1), embodiments of the present disclosure propose the following:

Embodiments of the present disclosure proposes defining MPR for intra-band con-current operation in a licensed band based on the combination of modulation order for SL and UL.

i) Example of Proposal Based on Option 1

Define MPR considering all combination of modulation order between SL and UL.

For example, MPR for Power Class 2 may be defined based on Table 18 and Table 19. MPR for Power Class 2 may be defined based on Table 20 and Table 21.

For another example, The UE may apply individual MPR to SL and UL according to the MO combination of SL and UL in the following way. MPR values for a case in which UL MO=QPSK in Table 18 to Table 21 are applied for SL MPR. MPR values for a case in which SL MO=QPSK in Table 18 to Table 21 are applied For UL MPR. In this case, MPR for Power Class 2 may be defined based on Table 30 and Table 31. MPR for Power Class 2 may be defined based on Table 32 and Table 33.

ii) Example of Proposal Based on Option 2

Define MPR considering combination of SL modulation order and highest UL modulation order.

For example, MPR for Power Class 2 may be defined based on Table 22 and Table 23. MPR for Power Class 2 may be defined based on Table 24 and Table 25.

iii) Example of Proposal Based on Option 3

Define MPR based on the highest MO between SL MO and UL MO.

For example, MPR for Power Class 2 may be defined based on Table 26 and Table 27. MPR for Power Class 2 may be defined based on Table 28 and Table 29.

For reference, ±α tolerance may be applied to MPR values shown in Table 18 to Table 33. α can be 0, 0.1, 0.2, 0.3, . . . , 2.0.

2. MPRs for Case A-2

In Case A-2, SL initial reference Tx Power ≠UL initial standard Tx Power, and same power control (DL path loss based power control) is applied.

Figure 19:
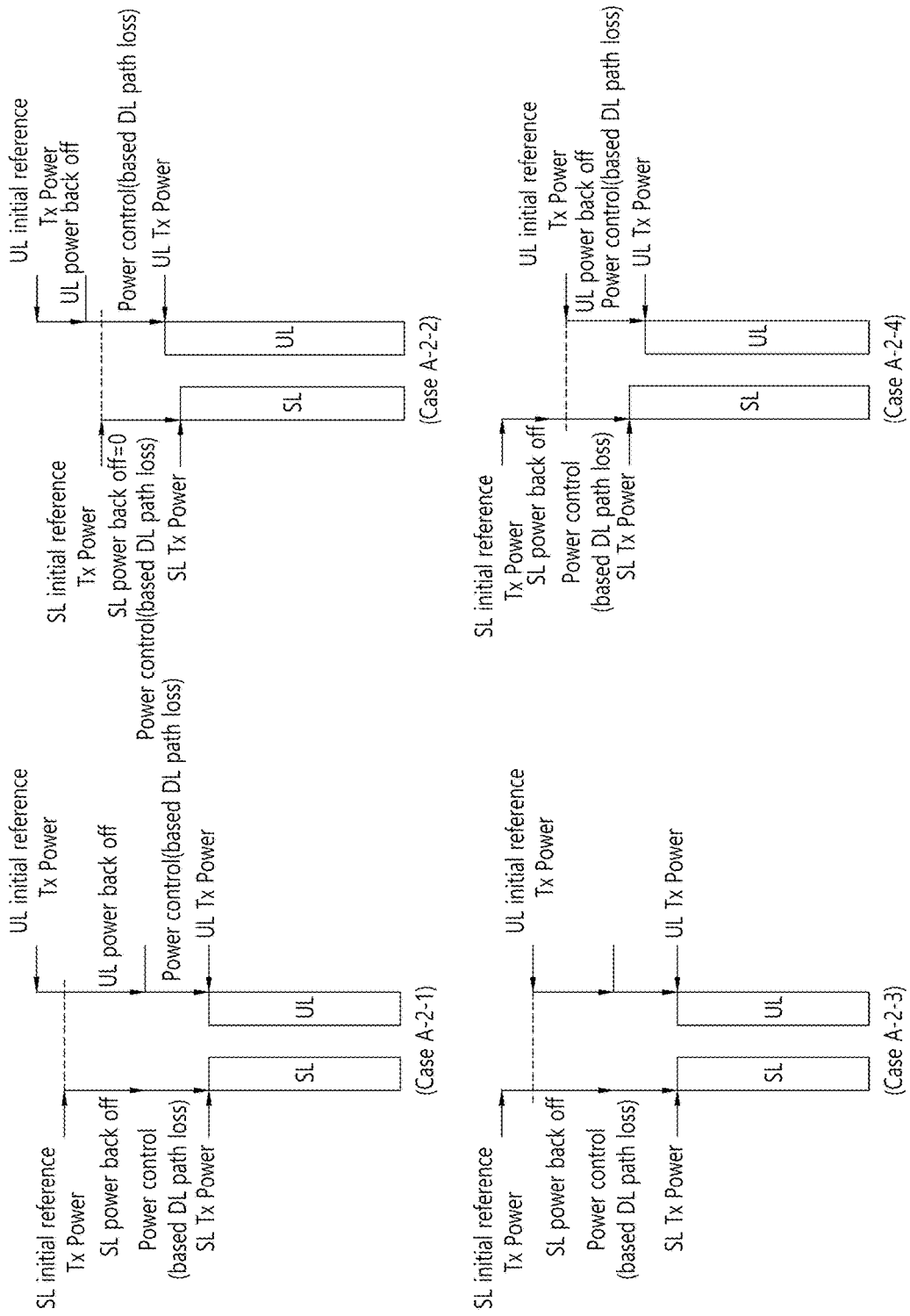
FIG. 19 illustrates examples of required back off for 4 cases based on case A-2 of the present disclosure.

The UE may determine MPR differently depending on cases A-2-1, A-2-2, A-2-3, A-2-4 as shown in FIG. 19.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 19 illustrates examples of required back off for 4 cases based on case A-2 of the present disclosure.

FIG. 19 shows examples of required Back off for SL and UL.

FIG. 19 shows examples of four cases based on case A-2. Cases A-2-1, A-2-2, A-2-3, A-2-4 may be explained as the following:

Case A-2-1: UL initial reference Tx power>SL initial reference Tx power & SL initial reference Tx power>UL initial reference Tx Power–UL power back off Case A-2-2: UL initial reference Tx power>SL initial reference Tx power & SL initial reference Tx power<=UL initial reference Tx Power–UL power back off Case A-2-3: SL initial reference Tx power>UL initial reference Tx power & UL initial reference Tx power>SL initial reference Tx Power–SL power back off Case A-2-4: SL initial reference Tx power>UL initial reference Tx power & UL initial reference Tx power<=SL initial reference Tx Power–SL power back off For cases A-2-1, A-2-2, A-2-3, A-2-4, the UE may apply MPR depending on Cases A-2-1, A-2-2, A-2-3, A-2-4. In the following descriptions, UL MPR is shown as "UL power back off" and SL MPR is shown as "SL power back off" in FIG. 19.

In Case A-2-1, the UE may apply MPR of Case A-1 for UL MPR to UL Tx power. The UE may apply SL MPR, which is equal to UL MPR–(UL initial reference Tx Power–SL initial reference Tx Power), to SL Tx power.

In Case A-2-2, the UE may apply MPR of Case A-1 for UL MPR to UL Tx power. The UE may apply SL MPR, which is '0', to UL Tx power for all modulation order combinations. Alternatively, the UE may apply SL MPR as 0.5 or 1.0 in consideration of the margin.

In Case A-2-3, the UE may apply MPR of Case A-1 for SL MPR to SL Tx power. The UE may apply UL MPR, which is equal to SL MPR–(SL initial reference Tx Power–UL initial reference Tx Power), to UL Tx power.

In Case A-2-4, the UE may apply MPR of Case A-1 for SL MPR to SL Tx power. The UE may apply UL MPR, which is '0', to UL Tx power for all modulation order combinations. Alternatively, the UE may apply UL MPR as 0.5 or 1.0 in consideration of the margin.

3. MPRs for Case B-1

In case B-1, SL initial standard Tx Power=UL initial standard Tx Power, and different power control (SL:SL path loss based, UL:DL path loss based) is applied.

For SL MPR and UL MPR, the UE may apply examples of MPR values shown in "1. MPRs for Case A-1". For example, the UE may apply MPR of Case A-1 for SL MPR to SL Tx power, the UE may apply MPR of Case A-1 for UL MPR to UL Tx power.

4. MPRs for Case B-2

In case B-2, SL initial standard Tx Power #UL initial standard Tx Power, and different power control (SL:SL path loss based, UL:DL path loss based) is applied.

For SL MPR and UL MPR, the UE may apply examples of MPR values shown in "1. MPRs for Case A-2". For example, the UE may apply MPR of Case A-2 for SL MPR to SL Tx power, the UE may apply MPR of Case A-2 for UL MPR to UL Tx power, depending on different cases, such as Cases A-2-1, A-2-2, A-2-3, A-2-4.

According to examples in the present disclosure, the UE may determine transmit power. The UE may determine transmit power for NR SL and the UE may determine transmit power for NR Uu. The UE may transmit SL signal based on the determined transmit power for NR SL. The UE may transmit Uu signal based on the determined transmit power for NR Uu. For determining the transmit power for NR SL and/or the UE may determine transmit power for NR Uu, the UE may apply MPR defined in examples of the present disclosure. For example, the UE may apply MPR based on Table 18 to Table 33, FIGS. 18 to 19. For example, the UE may apply MPR based on cases A-1, A-2, B-1, and B-2, Option 1 to Option 3, etc. The UE may apply MPR based on Option 3 for the cases A-1, A-2, B-1, and B-2. The MPR based on Option 3 may be less complex than MPR based on Option 1 or Option 2. The UE may determine MPR based on Modulation order for NR Uu and Modulation order for NR SL.

The following drawings are prepared to explain a specific example of the present specification. Since the names of specific devices or names of specific signals/messages/fields described in the drawings are provided by way of example, technical features of the present specification are not limited to specific names used in the following drawings.

Figure 20:
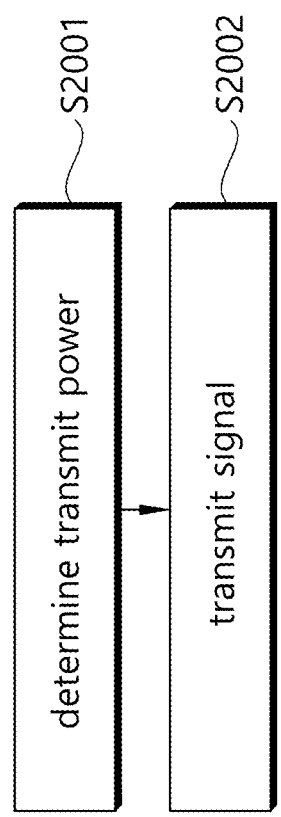
FIG. 20 illustrates an example of operations of a UE according to an embodiment of the present disclosure.

FIG. 20 illustrates an example of operations of a UE according to an embodiment of the present disclosure.

FIG. 20 shows an example of operations of the UE. UE may perform operations described in the present specification, even if they are not shown in FIG. 20. Herein, a network may be gNB, base station, serving cell, etc.

The UE may perform operations explained above with various examples based on examples of MPRs of the present disclosure. For example, the UE supports intra-band con-current operation of NR SL and NR Uu in a licensed band.

In step S2001, the UE may determine transmit power. The UE may determine transmit power for NR SL and the UE may determine transmit power for NR Uu. The UE may apply examples of MPR values for determining SL transmit power and UL (or Uu) transmit power.

For example, the UE may determine SL transmit power and UL (or Uu) transmit power based on the above explained case A-1, case A-2, case B-1, case B-2. Furthermore, the UE may determine SL transmit power and UL (or Uu) transmit power based on further depending on Option 1, Option 2, or Option 3.

In step S2002, the UE may transmit signal. For example, the UE may transmit UL signal based on the determined NR Uu transmit power. the UE may transmit SL signal based on the determined NR SL transmit power.

Hereinafter, an apparatus (for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configure to perform operations including: determining SL transmit power for SL signal based on MPR value; determining UL transmit power for UL signal based on the MPR value; transmitting the SL signal based on the SL transmit power; and transmitting the UL signal based on the UL transmit power. The UE may be configured to transmit the SL signal and the UL signal based on intra-band con-current operation. RBs for the SL signal and RBs for the UL signal are non-contiguously allocated. The MPR value may be determined based on highest modulation between modulation order for the SL signal and modulation order for the UL signal.

Hereinafter, a processor for in a wireless communication system, according to some embodiments of the present disclosure, will be described.

For example, the processor may be configured to perform operations including: determining SL transmit power for SL signal based on MPR value; determining UL transmit power for UL signal based on the MPR value; transmitting the SL signal based on the SL transmit power; and transmitting the UL signal based on the UL transmit power. The UE may be configured to transmit the SL signal and the UL signal based on intra-band con-current operation. RBs for the SL signal and RBs for the UL signal are non-contiguously allocated. The MPR value may be determined based on highest modulation between modulation order for the SL signal and modulation order for the UL signal.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE to perform operations including: determining SL transmit power for SL signal based on MPR value; determining UL transmit power for UL signal based on the MPR value; generating the SL signal based on the SL transmit power; and generating the UL signal based on the UL transmit power. The UE may be configured to transmit the SL signal and the UL signal based on intra-band con-current operation. RBs for the SL signal and RBs for the UL signal are non-contiguously allocated. The MPR value may be determined based on highest modulation between modulation order for the SL signal and modulation order for the UL signal.

Advantageous effects which can be obtained through specific embodiments of the present disclosure. A UE supporting simultaneously transmission of NR SL signal and NR Uu may determine transmission power efficiently and/or precisely. For example, the UE may apply MPR, based on modulation order for NR SL and modulation order for NR SL. Furthermore, the UE may determine transmission power based on the MPR values defined in the present disclosure, based on examples of various cases.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) configured to operate in a wireless system, the UE comprising:
   at least one transceiver;
   at least one processor; and
   at least one computer memory operably coupled to the at least one processor and storing instructions that, based on being executed by the at least one processor, perform operations comprising:
      determining sidelink (SL) transmit power for SL signal based on a Maximum Power Reduction (MPR) value for SL operation;
      determining Uplink (UL) transmit power for UL signal;
      transmitting the SL signal based on the SL transmit power; and
      transmitting the UL signal based on the UL transmit power,
      wherein the UE is configured to transmit the SL signal and the UL signal based on intra-band con-current operation,
      wherein Resource Blocks (RBs) for the SL signal and RBs for the UL signal are non-contiguously allocated or contiguously allocated, and wherein the MPR value for the SL operation is determined based on higher modulation between modulation order for the SL signal and modulation order for the UL signal.

2. The UE of claim 1, wherein the MPR value for the SL operation is determined based on a combination of Resource Block (RB) allocation and the higher modulation order.

3. The UE of claim 2, based on that the higher modulation order is Quadrature Phase Shift Keying (QPSK) and based on that the RBs for the SL signal and RBs for the UL signal are non-contiguously allocated, wherein the MPR value for the SL operation is determined to be equal to or smaller than:
   1.0 dB for inner RB allocation,
   1.5 dB for outer1 RB allocation, and
   3.0 dB for outer2 RB allocation.

4. The UE of claim 2, based on that the higher modulation order is 16 Quadrature Amplitude Modulation (QAM) and based on that the RBs for the SL signal and RBs for the UL signal are non-contiguously allocated, wherein the MPR value for the SL operation is determined to be equal to or smaller than:
   1.0 dB for inner RB allocation,
   1.5 dB for outer1 RB allocation, and
   3.0 dB for outer2 RB allocation.

5. The UE of claim 2, based on that the higher modulation order is 64 Quadrature Amplitude Modulation (QAM) and based on that the RBs for the SL signal and RBs for the UL signal are non-contiguously allocated, wherein the MPR value for the SL operation is determined to be equal to or smaller than:
   1.0 dB for inner RB allocation,
   1.5 dB for outer1 RB allocation, and
   3.0 dB for outer2 RB allocation.

6. The UE of claim 2, based on that the higher modulation order is 256 Quadrature Amplitude Modulation (QAM) and based on that the RBs for the SL signal and RBs for the UL signal are non-contiguously allocated, wherein the MPR value for the SL operation is determined to be equal to or smaller than:
   2.5 dB for inner RB allocation,
   2.5 dB for outer1 RB allocation, and
   3.5 dB for outer2 RB allocation.

7. The UE of claim 2, wherein the MPR value for the SL operation is determined further based on whether SL initial reference Tx power is same with UL initial reference Tx power or not.

8. The UE of claim 2, wherein the MPR value for the SL operation is determined further based on whether same power control operation is applied for SL transmit power and UL transmit power,
   wherein the power control operation is one of downlink (DL) path loss based power control and SL path loss based power control.

9. The UE of claim 2, based on that the higher modulation order is QPSK and based on that the RBs for the SL signal and RBs for the UL signal are contiguously allocated, wherein the MPR value for the SL operation is determined to be equal to or smaller than:
   1.5 dB for inner RB allocation, and
   3.5 dB for outer RB allocation.

10. The UE of claim 2, based on that the higher modulation order is 16QAM and based on that the RBs for the SL signal and RBs for the UL signal are contiguously allocated, wherein the MPR value for the SL operation is determined to be equal to or smaller than:
   2.0 dB for inner RB allocation, and
   3.5 dB for outer RB allocation.

11. The UE of claim 2, based on that the higher modulation order is 64QAM and based on that the RBs for the SL signal and RBs for the UL signal are contiguously allocated, wherein the MPR value for the SL operation is determined to be equal to or smaller than:
   3.0 dB for inner RB allocation, and
   3.5 dB for outer RB allocation.

12. The UE of claim 2, based on that the higher modulation order is 256QAM and based on that the RBs for the SL signal and RBs for the UL signal are contiguously allocated, wherein the MPR value for the SL operation is determined to be equal to or smaller than:
   5.0 dB for inner RB allocation, and
   5.5 dB for outer RB allocation.

13. The UE of claim 1, wherein the UL transmit power for the UL signal is determined based on the MPR value for the SL operation.

14. A method for performing communication, the method performed by a User Equipment (UE) and comprising:
   determining sidelink (SL) transmit power for SL signal based on a Maximum Power Reduction (MPR) value for SL operation;
   determining Uplink (UL) transmit power for UL signal;
   transmitting the SL signal based on the SL transmit power; and
   transmitting the UL signal based on the UL transmit power,
   wherein the UE is configured to transmit the SL signal and the UL signal based on intra-band con-current operation,
   wherein Resource Blocks (RBs) for the SL signal and RBs for the UL signal are non-contiguously allocated or contiguously allocated, and
   wherein the MPR value for the SL operation is determined based on higher modulation between modulation order for the SL signal and modulation order for the UL signal.

15. The method of claim 14, wherein the UL transmit power for the UL signal is determined based on the MPR value for the SL operation.

16. A wireless communication device operating in a wireless communication system, the wireless communication device comprising:
   at least processor; and
   at least one computer memory operably coupled to the at least one processor,
   wherein the at least one processor is configured to perform operations comprising:
   determining sidelink (SL) transmit power for SL signal based on a Maximum Power Reduction (MPR) value for SL operation;
   determining Uplink (UL) transmit power for UL signal;
   generating the SL signal based on the SL transmit power; and
   generating the UL signal based on the UL transmit power,
   wherein the UE is configured to transmit the SL signal and the UL signal based on intra-band con-current operation,
   wherein Resource Blocks (RBs) for the SL signal and RBs for the UL signal are non-contiguously allocated, and
   wherein the MPR value for the SL operation is determined based on higher modulation between modulation order for the SL signal and modulation order for the UL signal.

17. The wireless communication device of claim 16, wherein the UL transmit power for the UL signal is determined based on the MPR value for the SL operation.

\* \* \* \* \*